US012598124B2

(12) United States Patent
Zhou et al.

(10) Patent No.: US 12,598,124 B2
(45) Date of Patent: Apr. 7, 2026

(54) NETWORK PERFORMANCE MEASUREMENT METHOD, APPARATUS, DEVICE, AND SYSTEM, AND STORAGE MEDIUM

(71) Applicant: Huawei Technologies Co., Ltd., Shenzhen (CN)

(72) Inventors: Tianran Zhou, Beijing (CN); Yuezhong Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 551 days.

(21) Appl. No.: 18/074,004

(22) Filed: Dec. 2, 2022

(65) Prior Publication Data

US 2023/0102193 A1 Mar. 30, 2023

Related U.S. Application Data

(63) Continuation of application No. PCT/CN2021/096904, filed on May 28, 2021.

(30) Foreign Application Priority Data

| Jun. 2, 2020 | (CN) | .......................... | 202010489773.6 |
| Jul. 10, 2020 | (CN) | .......................... | 202010664952.9 |

(51) Int. Cl.
*H04L 43/10* (2022.01)
*H04L 41/04* (2022.01)
(Continued)

(52) U.S. Cl.
CPC .............. *H04L 43/10* (2013.01); *H04L 41/34* (2022.05); *H04L 43/08* (2013.01)

(58) Field of Classification Search
CPC ......... H04L 43/10; H04L 41/34; H04L 43/08; H04L 43/50; H04L 43/065;
(Continued)

(56) References Cited

U.S. PATENT DOCUMENTS

| 2011/0222403 A1 | 9/2011 | Suh et al. |
| 2019/0394124 A1 | 12/2019 | Pignataro et al. |
(Continued)

FOREIGN PATENT DOCUMENTS

| CN | 102739448 A | 10/2012 |
| CN | 102792733 A | 11/2012 |
(Continued)

OTHER PUBLICATIONS

Z. Ali et al "Operations, Administration, and Maintenance (OAM) in Segment Routing over IPv6 (SRv6)," Internet Engineering Task Force (IETF), RFC 9259, Jun. 2022, 19 pages.
(Continued)

*Primary Examiner* — Schquita D Goodwin
(74) *Attorney, Agent, or Firm* — Conley Rose, P.C.

(57) ABSTRACT

A network performance measurement method includes a first network device that sends a first active measurement protocol packet to a second network device, where the first active measurement protocol packet includes measurement indication information, where the measurement indication information indicates a measurement device on a forward path to measure network performance. The forward path is a forwarding path of the first active measurement protocol packet, and the first network device and the second network device are two ends of the forward path, and the measurement device on the forward path includes at least one intermediate device on the forward path. The intermediate device measures network performance of the forward path.

20 Claims, 23 Drawing Sheets

Sender (Sender)

Reflector (Reflector)

Trigger sending and carry related performance information

(51) Int. Cl.
　　*H04L 41/34*　　　　(2022.01)
　　*H04L 43/08*　　　　(2022.01)

(58) Field of Classification Search
　　CPC ............. H04L 43/0829; H04L 43/0852; H04L
　　　　　　43/0864; H04L 43/087; H04L 43/0894
　　See application file for complete search history.

(56)　　　　　　References Cited

U.S. PATENT DOCUMENTS

| | | | | |
|---|---|---|---|---|
| 2020/0084143 | A1* | 3/2020 | Gandhi | .................... H04L 45/24 |
| 2020/0099603 | A1* | 3/2020 | Gupta | ................. H04L 43/0864 |
| 2020/0204469 | A1* | 6/2020 | Filsfils | ................. H04L 45/123 |
| 2020/0322353 | A1* | 10/2020 | Bhandari | ............ H04L 63/1425 |
| 2021/0076292 | A1* | 3/2021 | Pignataro | ............ H04L 43/0817 |
| 2021/0119895 | A1 | 4/2021 | Li et al. | |
| 2021/0176142 | A1* | 6/2021 | Clarke | ................ H04L 41/5051 |
| 2021/0258227 | A1* | 8/2021 | Batos-Parac | ............ H04L 41/14 |
| 2022/0217070 | A1 | 7/2022 | Zhou et al. | |

FOREIGN PATENT DOCUMENTS

| | | | |
|---|---|---|---|
| CN | 110636001 | A | 12/2019 |
| CN | 110971445 | A | 4/2020 |
| EP | 1921798 | A1 | 5/2008 |
| EP | 2787687 | A1 | 10/2014 |

OTHER PUBLICATIONS

R. Bonica et al "OAM Capabilities for IPV6," draft-bonica-6man-oam-04, Internet-Draft, Sep. 16, 2019, 15 pages.
G. Mirsky et al "Simple Two-way Active Measurement Protocol," draft-ietf-ippm-stamp-05, Internet-Draft, Nov. 28, 2018,29 pages.

\* cited by examiner

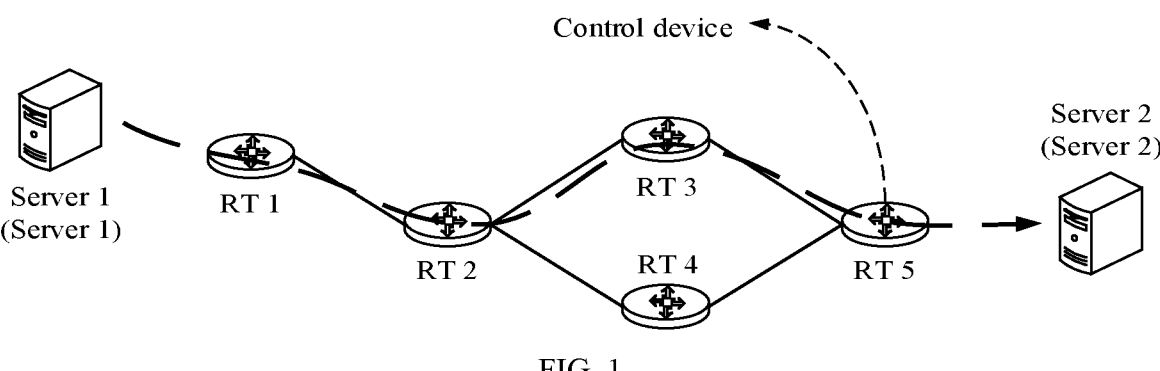

FIG. 1

A first network device sends a first active measurement protocol packet to a second
network device, where the first active measurement protocol packet includes
measurement indication information, the measurement indication information is
used to indicate a measurement device on a forward path to measure network
performance, the forward path is a forwarding path of the first active measurement
protocol packet, the first network device and the second network device are two
ends of the forward path, and the measurement device on the forward path includes
at least one intermediate device on the forward path

| Bit (Bit) | Action (Action) | Notes (Notes) |
|---|---|---|
| 0 | Recording a data packet | A processing device creates a log entry that reflects when it was created and when the data packet arrived |
| 1 | Counting data packets | The processing device adds a counter |
| 2 | Sending ICMPv6 OAM | The processing device sends an ICMP OAM message to a source node device of the data packet, where the OAM message indicates an occurrence time of the packet |
| 3 | Sending measurement information | The processing device sends measurement information to a monitoring device, where the measurement information includes the data packet and the arrival time of the data packet |
| 4-15 | Reserved fields | |

FIG. 3

Node data list (node data list) [0]

Node data list (node data list) [1]

...

Node data list (node data list) [n–1]

Node data list (node data list) [n]

Data space
(data space)

| HBH OAM | Length (LENGTH) |
|---|---|
| hbh delay (delay) | Field length (length) |
| Value (value) | |
| hbh path (path) | Field length (length) |
| Value (value) | |
| ... | |

| hbh delay<br>(delay) | Field length<br>(length) |
|---|---|
| Value<br>(value) ||

| hbh path<br>(path) | Field length<br>(length) |
|---|---|
| Value<br>(value) ||

| ... | Field length<br>(length) |
|---|---|
| ... ||

FIG. 5B

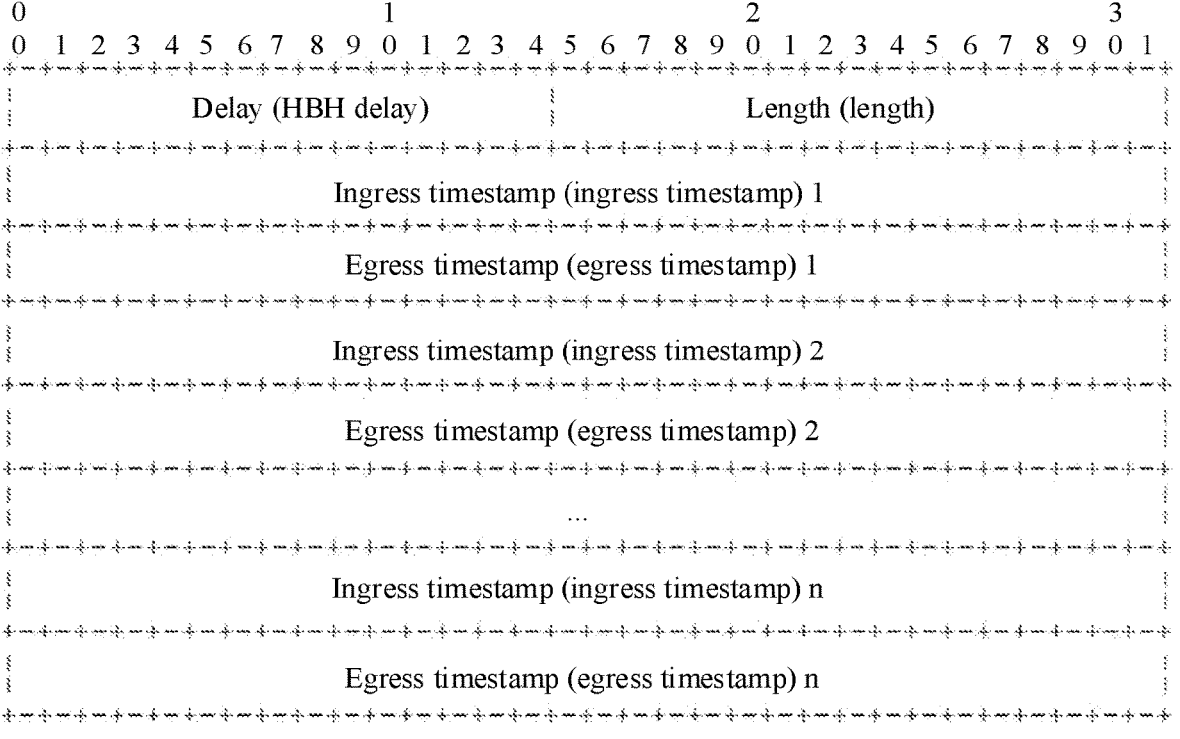

FIG. 5C

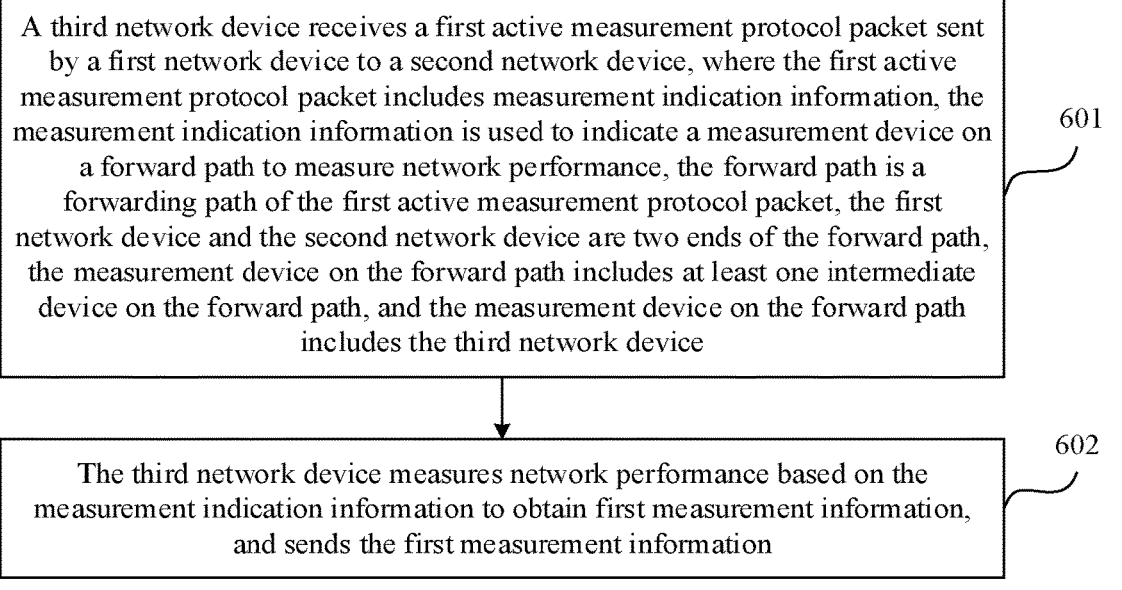

A third network device receives a first active measurement protocol packet sent by a first network device to a second network device, where the first active measurement protocol packet includes measurement indication information, the measurement indication information is used to indicate a measurement device on a forward path to measure network performance, the forward path is a forwarding path of the first active measurement protocol packet, the first network device and the second network device are two ends of the forward path, the measurement device on the forward path includes at least one intermediate device on the forward path, and the measurement device on the forward path includes the third network device

601

The third network device measures network performance based on the measurement indication information to obtain first measurement information, and sends the first measurement information

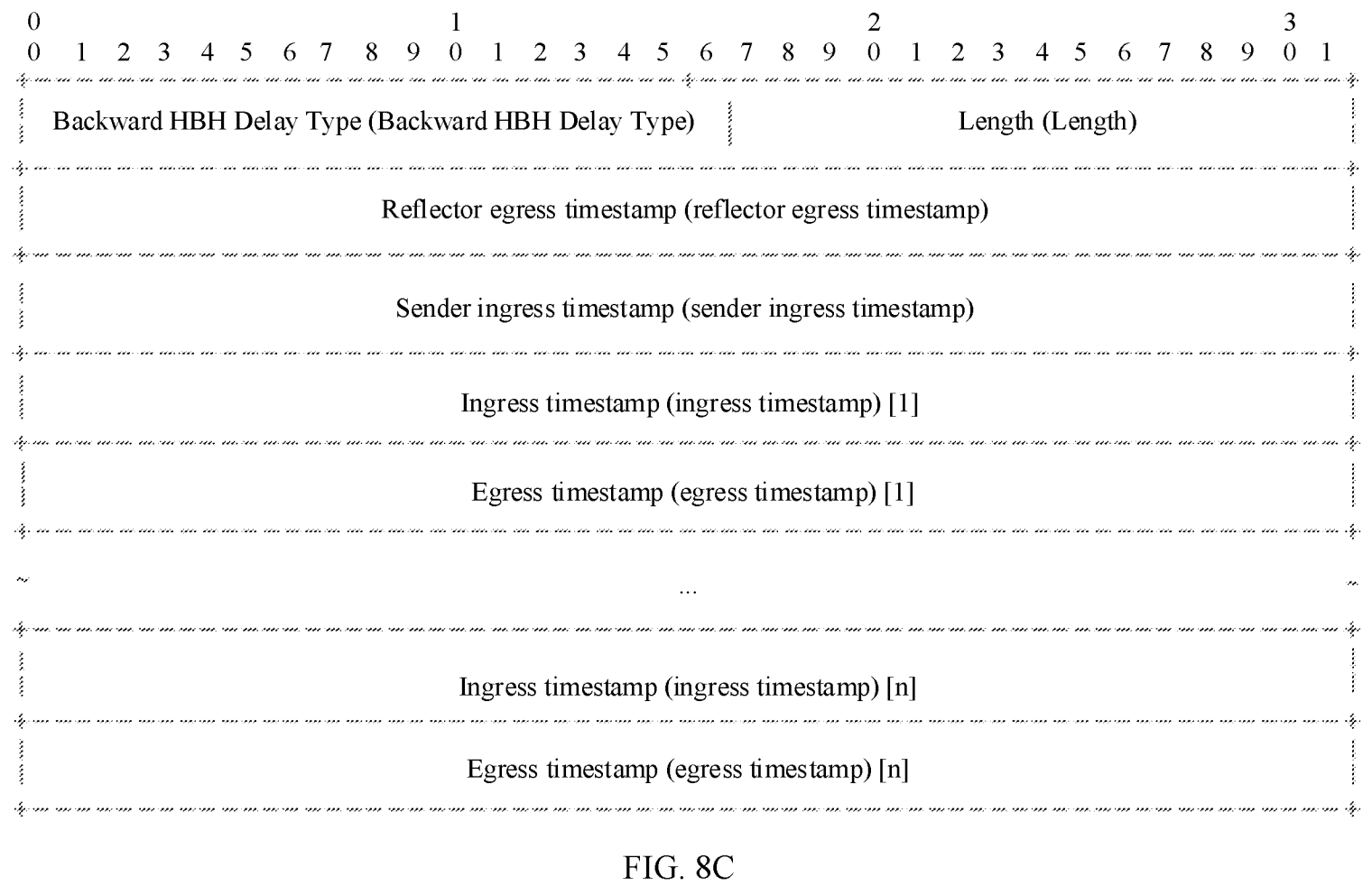

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Backward HBH Delay Type (Backward HBH Delay Type) |    Length (Length)    |
+-+-+-+-+-+-+-+-+-+-+-+-+-+-+-+-+-+-+-+-+-+-+-+-+-+-+-+-+-+-+-+-+
|          Reflector egress timestamp (reflector egress timestamp)          |
+-+-+-+-+-+-+-+-+-+-+-+-+-+-+-+-+-+-+-+-+-+-+-+-+-+-+-+-+-+-+-+-+
|          Sender ingress timestamp (sender ingress timestamp)              |
+-+-+-+-+-+-+-+-+-+-+-+-+-+-+-+-+-+-+-+-+-+-+-+-+-+-+-+-+-+-+-+-+
|               Ingress timestamp (ingress timestamp) [1]                    |
+-+-+-+-+-+-+-+-+-+-+-+-+-+-+-+-+-+-+-+-+-+-+-+-+-+-+-+-+-+-+-+-+
|               Egress timestamp (egress timestamp) [1]                      |
+-+-+-+-+-+-+-+-+-+-+-+-+-+-+-+-+-+-+-+-+-+-+-+-+-+-+-+-+-+-+-+-+
                                ...
+-+-+-+-+-+-+-+-+-+-+-+-+-+-+-+-+-+-+-+-+-+-+-+-+-+-+-+-+-+-+-+-+
|               Ingress timestamp (ingress timestamp) [n]                    |
+-+-+-+-+-+-+-+-+-+-+-+-+-+-+-+-+-+-+-+-+-+-+-+-+-+-+-+-+-+-+-+-+
|               Egress timestamp (egress timestamp) [n]                      |
+-+-+-+-+-+-+-+-+-+-+-+-+-+-+-+-+-+-+-+-+-+-+-+-+-+-+-+-+-+-+-+-+
```

FIG. 8C

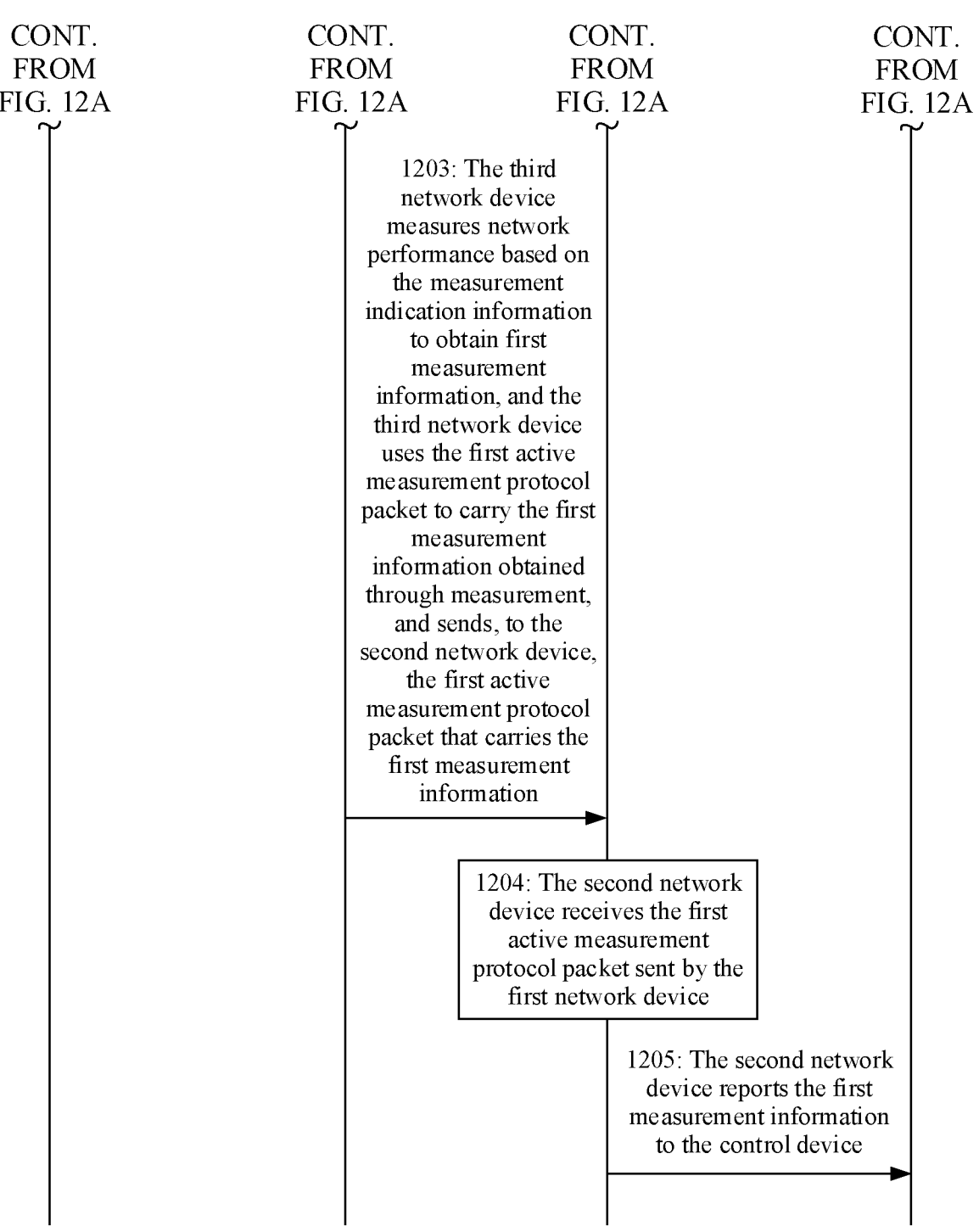

CONT.
FROM
FIG. 12A

CONT.
FROM
FIG. 12A

CONT.
FROM
FIG. 12A

CONT.
FROM
FIG. 12A

1203: The third network device measures network performance based on the measurement indication information to obtain first measurement information, and the third network device uses the first active measurement protocol packet to carry the first measurement information obtained through measurement, and sends, to the second network device, the first active measurement protocol packet that carries the first measurement information 1204: The second network device receives the first active measurement protocol packet sent by the first network device 1205: The second network device reports the first measurement information to the control device

FIG. 12B

Trigger sending and carry
related performance
information

NETWORK PERFORMANCE MEASUREMENT METHOD, APPARATUS, DEVICE, AND SYSTEM, AND STORAGE MEDIUM

CROSS-REFERENCE TO RELATED APPLICATIONS

This application is a continuation application of International Patent Application No. PCT/CN2021/096904, filed on May 28, 2021, which claims priority to Chinese Patent Application No. 202010489773.6, filed on Jun. 2, 2020, and Chinese Patent Application No. 202010664952.9, filed on Jul. 10, 2020. All of the aforementioned patent applications are hereby incorporated by reference in their entireties.

TECHNICAL FIELD

This application relates to the field of communications technologies, and in particular, to a network performance measurement method, apparatus, device, and system, and a storage medium.

BACKGROUND

With development of communications technologies, a network scale gradually increases, how to improve network quality becomes more and more important, and network performance measurement becomes a key to control network quality.

SUMMARY

This application provides a network performance measurement method, apparatus, device, system, and a storage medium, to resolve the problem existing in the related technology. The technical solutions are as follows:

According to a first aspect, a network performance measurement method is provided. For example, a first network device performs the method, and the method includes: The first network device sends a first active measurement protocol packet to a second network device, where the first active measurement protocol packet includes measurement indication information, the measurement indication information is used to indicate a measurement device on a forward path to measure network performance, the forward path is a forwarding path of the first active measurement protocol packet, the first network device and the second network device are two ends of the forward path, and the measurement device on the forward path includes at least one intermediate device on the forward path.

The first active measurement protocol packet carries the measurement indication information, to indicate a measurement device on the measurement path to measure network performance. In addition, the measurement device is an intermediate device on the measurement path. Therefore, the intermediate device can measure network performance, so that a range of nodes for measuring network performance is more comprehensive, and obtained measurement information is more comprehensive, thereby meeting a requirement of a large-scale network for performance data collection.

In a possible implementation, the first active measurement protocol packet includes a segment list, the segment list is used to indicate the forward path, and the measurement indication information is included in a segment identifier corresponding to the measurement device on the forward path in the segment list.

Because the measurement indication information is included in the segment identifier corresponding to the measurement device on the forward path in the segment list, a corresponding intermediate device can be indicated, by using a segment identifier, to measure network performance. In addition, the measurement indication information is included in the segment identifier corresponding to the measurement device, so that some intermediate devices on the forward path can be designated as measurement devices, thereby improving flexibility.

In a possible implementation, the first active measurement protocol packet includes an In-situ Operation, Administration and Maintenance (IOAM) header, the measurement indication information is included in the IOAM header, and the measurement device on the forward path includes an intermediate device having an IOAM measurement capability on the forward path.

Because the measurement indication information is included in the IOAM header, the IOAM header can be used to indicate an intermediate device having the IOAM measurement capability on the forward path to measure network performance.

In a possible implementation, the measurement indication information includes first indication information and second indication information, the first active measurement protocol packet includes an IOAM header and a segment list, the first indication information is included in the IOAM header, the segment list is used to indicate the forward path, and the second indication information is included in a segment identifier corresponding to the measurement device on the forward path in the segment list.

Because the measurement indication information not only includes the first indication information in the IOAM header, but also includes the second indication information in the segment identifier corresponding to the measurement device on the forward path in the segment list, the segment identifier and the IOAM header can be used to indicate a corresponding intermediate device having the IOAM measurement capability to measure network performance.

In a possible implementation, after the first network device sends the first active measurement protocol packet to the second network device, the method further includes: the first network device receives a second packet sent by the second network device, where the second packet includes first measurement information obtained by the measurement device on the forward path by measuring network performance based on the measurement indication information.

The second packet sent by the second network device is received. Because the second packet includes the first measurement information that is obtained by the measurement device on the forward path by measuring network performance based on the measurement indication information, the first network device can collect the first measurement information obtained by the measurement device on the forward path through measurement.

In a possible implementation, the second packet is a reflected test packet of the first active measurement protocol packet, the second packet further includes reverse indication information, the reverse indication information is used to indicate a measurement device on a reverse path to measure network performance, the reverse path is a forwarding path of the second packet, the second network device and the first network device are two ends of the reverse path, and the measurement device on the reverse path includes at least one intermediate device on the reverse path.

The reverse indication information included in the second packet is used to indicate the measurement device on the reverse path to measure network performance, so that the first network device collects measurement information obtained by the measurement device on the reverse path through measurement.

In a possible implementation, the measurement device on the reverse path is the same as the measurement device on the forward path, or the measurement device on the reverse path is different from the measurement device on the forward path.

Because the measurement device on the reverse path is the same as or different from the measurement device on the forward path, measurement devices on the two measurement paths may be flexibly selected, thereby improving flexibility of collecting network performance measurement information.

In a possible implementation, the second packet further includes second measurement information obtained by the measurement device on the reverse path by measuring network performance based on the reverse indication information.

In a possible implementation, the second measurement information is included in a reverse type-length-value (TLV) field of the second packet.

In a possible implementation, after the first network device receives the second packet sent by the second network device, the method further includes: the first network device obtains a network performance measurement result based on the first measurement information; and the first network device sends the first measurement information to a control device.

In a possible implementation, the first active measurement protocol packet further includes a measurement type identifier, and the measurement type identifier is used to indicate a type of network performance measured by the measurement device on the forward path.

The measurement type identifier is used to indicate a type of network performance measured by the measurement device on the forward path, so that the measurement device on the forward path can clearly know the type of network performance to be measured, thereby collecting measurement information of network performance of the corresponding type.

In a possible implementation, types of network performance include one or more of the following: delay information, jitter information, path information, packet loss information, and bandwidth information.

In a possible implementation, the first active measurement protocol packet includes a Simple Two-Way Active Measurement Protocol (STAMP) packet, a One-Way Active Measurement Protocol (OWAMP) packet, or a Two-Way Active Measurement Protocol (TWAMP) packet.

According to a second aspect, a network performance measurement method is provided. For example, a third network device performs the method, and the method includes: The third network device receives a first active measurement protocol packet sent by a first network device to a second network device, where the first active measurement protocol packet includes measurement indication information, the measurement indication information is used to indicate a measurement device on a forward path to measure network performance, the forward path is a forwarding path of the first active measurement protocol packet, the first network device and the second network device are two ends of the forward path, the measurement device on the forward path includes at least one intermediate device on the forward path, and the measurement device on the forward path includes the third network device; the third network device measures network performance based on the measurement indication information, to obtain first measurement information; and the third network device sends the first measurement information.

The third network device receives the first active measurement protocol packet.

Because the first active measurement protocol packet carries the measurement indication information, to indicate the third network device on the forward path to measure network performance, and the third network device is an intermediate device on the forward path, the intermediate device can measure network performance, so that a range of nodes for measuring network performance is more comprehensive, and obtained measurement information is more comprehensive, thereby meeting a requirement of a large-scale network for performance data collection.

In a possible implementation, the first active measurement protocol packet includes a segment list, and the segment list is used to indicate the forward path.

That the third network device measures network performance based on the measurement indication information, to obtain first measurement information includes: when a destination address field of the first active measurement protocol packet includes a local segment identifier including the measurement indication information, the third network device measures network performance to obtain the first measurement information.

Because the measurement indication information is included in the segment identifier corresponding to the measurement device on the forward path in the segment list, after the third network device determines that the destination address field of the first active measurement protocol packet includes the local segment identifier and the local segment identifier includes the measurement indication information, the third network device can be triggered to measure network performance.

In a possible implementation, the first active measurement protocol packet includes IOAM header of IOAM, and the measurement indication information is included in the IOAM header.

Before the third network device measures network performance based on the measurement indication information, to obtain the first measurement information, the method further includes: The third network device obtains the measurement indication information from the IOAM header, where the third network device is a device having an IOAM measurement capability.

Because the measurement indication information is included in the IOAM header, the IOAM header can be used to indicate the third network device having the IOAM measurement capability on the forward path to measure network performance.

In a possible implementation, the measurement indication information includes first indication information and second indication information, the first active measurement protocol packet includes an IOAM header and a segment list, the first indication information is included in the IOAM header, the segment list is used to indicate the forward path, and the second indication information is included in a segment identifier corresponding to the measurement device on the forward path in the segment list.

Before the third network device measures network performance based on the measurement indication information, to obtain the first measurement information, the method further includes: The third network device obtains the first indication information from the IOAM header; and the third network device obtains the second indication information from a segment identifier corresponding to the third network device.

Because the measurement indication information not only includes the first indication information in the IOAM header, but also includes the second indication information in the segment identifier corresponding to the measurement device on the forward path in the segment list, the segment identifier and the IOAM header can be used to indicate the third network device having the IOAM measurement capability to measure network performance.

In a possible implementation, that the third network device sends the first measurement information includes: the third network device adds the first measurement information to the first active measurement protocol packet, and sends, to the second network device, the first active measurement protocol packet that carries the first measurement information.

The first measurement information is carried in the first active measurement protocol packet, and the first active measurement protocol packet that carries the first measurement information is sent to the second network device, so that the second network device collects the first measurement information obtained by the measurement device on the forward path through measurement.

In a possible implementation, the first measurement information is carried in a node data list or a forward TLV field of the first active measurement protocol packet.

In a possible implementation, that the third network device sends the first measurement information includes: the third network device sends the first measurement information to a control device.

The first measurement information is sent to the control device, so that the control device collects the first measurement information.

In a possible implementation, after the third network device receives the first active measurement protocol packet sent by the first network device to the second network device, the method further includes: the third network device receives a reflected test packet that is of the first active measurement protocol packet and that is sent by the second network device to the first network device, where the reflected test packet includes reverse indication information, the reverse indication information is used to indicate a measurement device on a reverse path to measure network performance, the reverse path is a forwarding path of the second packet, the second network device and the first network device are two ends of the reverse path, and the measurement device on the reverse path includes the third network device; the third network device measures network performance based on the reverse indication information, to obtain second measurement information; and the third network device sends the second measurement information.

The reverse indication information included in the second active measurement protocol packet is used to indicate the third network device on the reverse path to measure network performance, and to send the second measurement information obtained through measurement, so that the second measurement information obtained through measurement by the measurement device on the reverse path is collected.

In a possible implementation, the reflected test packet includes the first measurement information. The reflected test packet includes the first measurement information, so that both the first measurement information and the second measurement information are collected.

In a possible implementation, the first measurement information is included in an IOAM TLV field or a forward TLV field of the reflected test packet.

In a possible implementation, the measurement device on the reverse path is the same as the measurement device on the forward path, or the measurement device on the reverse path is different from the measurement device on the forward path.

Because the measurement device on the reverse path is the same as or different from the measurement device on the forward path, measurement devices on the two measurement paths may be flexibly selected, thereby improving flexibility of collecting network performance measurement information.

In a possible implementation, the first active measurement protocol packet includes a measurement type identifier, the measurement type identifier is used to indicate a type of network performance measured by the measurement device on the forward path, and the type of network performance includes one or more of the following: delay information, jitter information, path information, packet loss information, and bandwidth information.

The measurement type identifier is used to indicate a type of network performance measured by the measurement device on the forward path, so that the third network device on the forward path can clearly know the type of network performance to be measured, thereby collecting measurement information of network performance of the corresponding type.

According to a third aspect, a network performance measurement method is provided. That a second network device performs the method is used as an example. The method includes: The second network device receives a first active measurement protocol packet sent by a first network device, where the first active measurement protocol packet includes measurement indication information, the measurement indication information is used to indicate a measurement device on a forward path to measure network performance, the forward path is a forwarding path of the first active measurement protocol packet, the first network device and the second network device are two ends of the forward path, the measurement device on the forward path includes at least one intermediate device on the forward path, and the first active measurement protocol packet further includes first measurement information obtained by the measurement device on the forward path by measuring network performance based on the measurement indication information; and the second network device sends the first measurement information.

The second network device receives the first active measurement protocol packet. Because the first active measurement protocol packet carries the measurement indication information, to indicate the measurement device on the forward path to measure network performance, and the first active measurement protocol packet includes the first measurement information obtained by the measurement device on the forward path by measuring network performance based on the measurement indication information, the intermediate device can measure network performance, so that a range of nodes for measuring network performance is more comprehensive, and obtained measurement information is more comprehensive, thereby meeting a requirement of a large-scale network for performance data collection.

In a possible implementation, that the second network device sends the first measurement information includes:

The second network device sends a second packet to the first network device, where the second packet includes the first measurement information.

The second network device sends the second packet to the first network device.

Because the second packet includes the first measurement information that is obtained by the measurement device on the forward path by measuring network performance based on the measurement indication information, the first network device can collect the first measurement information obtained by the measurement device on the forward path through measurement.

In a possible implementation, the first measurement information is included in a node data list of the first active measurement protocol packet, and the first measurement information is included in an IOAM TLV field of the second packet.

That the second network device sends a second packet to the first network device includes that the second network device copies the first measurement information from the node data list to the IOAM TLV field.

In a possible implementation, the first measurement information is included in a forward TLV field of the first active measurement protocol packet, and the first measurement information is included in a forward TLV field of the second packet.

That the second network device sends a second packet to the first network device includes that the second network device copies the first measurement information from the forward TLV field of the first active measurement protocol packet to the forward TLV field of the second packet.

In a possible implementation, the second packet is a reflected test packet of the first active measurement protocol packet, the second packet further includes reverse indication information, the reverse indication information is used to indicate a measurement device on a reverse path to measure network performance, the reverse path is a forwarding path of the second packet, the second network device and the first network device are two ends of the reverse path, and the measurement device on the reverse path includes at least one intermediate device on the reverse path.

The reverse indication information included in the second packet is used to indicate the measurement device on the reverse path to measure network performance, so that the first network device collects measurement information obtained by the measurement device on the reverse path through measurement.

In a possible implementation of the first aspect to the third aspect, the first measurement information is included in a TLV field of the second packet. The first measurement information is included in the TLV field of the second packet, so that the first measurement information can be fed back by using the second packet.

In a possible implementation, that the second network device sends the first measurement information includes: The second network device sends the first measurement information to a control device.

In a possible implementation, the second active measurement protocol packet further includes third measurement information obtained by the second network device by measuring network performance based on the measurement indication information.

The method further includes: the second network device sends the third measurement information.

In a possible implementation, the first active measurement protocol packet includes a STAMP packet, an OWAMP packet, or a TWAMP packet.

According to a fourth aspect, a network performance measurement apparatus is provided, and performs the method in any one of the first aspect or the possible implementations of the first aspect. Specifically, the measurement apparatus includes units configured to perform the method in any one of the first aspect or the possible implementations of the first aspect.

According to a fifth aspect, a network performance measurement apparatus is provided, and performs the method in any one of the second aspect or the possible implementations of the second aspect. Specifically, the measurement apparatus includes units configured to perform the method in any one of the second aspect or the possible implementations of the second aspect.

According to a sixth aspect, a network performance measurement apparatus is provided, and performs the method in any one of the third aspect or the possible implementations of the third aspect. Specifically, the measurement apparatus includes units configured to perform the method in any one of the third aspect or the possible implementations of the third aspect.

According to a seventh aspect, a network device is provided. The network device includes a memory and a processor, where the memory stores at least one instruction, and the at least one instruction is loaded and executed by the processor, to implement any one of the foregoing network performance measurement methods.

In an example embodiment, there are one or more processors, and there are one or more memories.

In an example embodiment, the memory may be integrated with the processor, or the memory is disposed independently of the processor.

In an implementation process, the memory may be a non-transitory memory, for example, a read-only memory (ROM). The memory and the processor may be integrated into a same chip, or may be disposed in different chips. A type of the memory and a manner in which the memory and the processor are disposed are not limited in this embodiment of this application.

According to an eighth aspect, a communications apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method according to any one of the first aspect or the possible implementations of the first aspect.

According to a ninth aspect, a communications apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method according to any one of the second aspect or the possible implementations of the second aspect.

According to a tenth aspect, a communications apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method according to any one of the third aspect or the possible implementations of the third aspect.

According to an eleventh aspect, a network performance measurement system is provided, where the network performance measurement system includes a first network device, a second network device, and a third network device.

The first network device is configured to perform the method according to any one of the first aspect or the possible implementations of the first aspect, the second network device is configured to perform the method according to any one of the third aspect or the possible implementations of the third aspect, and the third network device is configured to perform the method according to any one of the second aspect or the possible implementations of the second aspect.

According to a twelfth aspect, a computer-readable storage medium is provided, where the storage medium stores at least one instruction, and the instruction is loaded and executed by a processor to implement any one of the foregoing network performance measurement methods.

According to a thirteenth aspect, a computer program (e.g., computer program product) is provided, where the computer program includes computer program code, and when the computer program code is run by a computer, the computer is enabled to perform the methods in the foregoing aspects.

According to a fourteenth aspect, a chip is provided, including a processor, configured to invoke, from a memory, and run instructions stored in the memory, so that a communications device in which the chip is installed performs the methods in the foregoing aspects.

According to a fifteenth aspect, another chip is provided, including an input interface, an output interface, a processor, and a memory. The input interface, the output interface, the processor, and the memory are connected to each other by using an internal connection channel. The processor is configured to execute code in the memory, and when the code is executed, the processor is configured to perform the methods in the foregoing aspects.

It should be understood that, for beneficial effects achieved by the technical solutions in the fourth aspect to the fifteenth aspect of the embodiments of this application and the corresponding possible implementations, refer to the technical effects of the first aspect to the third aspect and the corresponding possible implementations. Details are not described herein again.

BRIEF DESCRIPTION OF DRAWINGS

FIG. 1 is a schematic diagram of an implementation environment according to an embodiment of this application;

FIG. 2 is a flowchart of a network performance measurement method according to an embodiment of this application;

FIG. 3 is a schematic diagram of a structure of OAM information according to an embodiment of this application;

FIG. 5B is a schematic diagram of a structure of a TLV field according to an embodiment of this application;

FIG. 5C is a schematic diagram of a structure of a TLV field according to an embodiment of this application;

FIG. 6 is a flowchart of a network performance measurement method according to an embodiment of this application;

FIG. 8C is a schematic diagram of a structure of a TLV field according to an embodiment of this application;

FIG. 12A and FIG. 12B are a schematic diagram of interaction of a network performance measurement method according to an embodiment of this application;

DESCRIPTION OF EMBODIMENTS

Figure 4A:
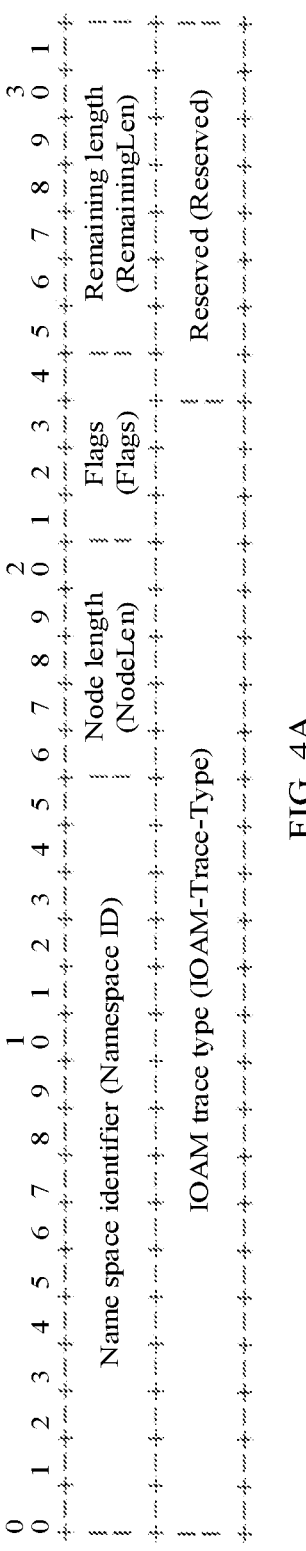
FIG. 4A is a schematic diagram of a structure of an IOAM header according to an embodiment of this application.

Terms used in an implementation part of this application are used to explain embodiments of this application, and are not intended to limit this application.

To better operate, maintain, and manage a network, there is usually a demand for measuring network performance, so as to improve network quality by using measurement information obtained by measuring the network performance. In view of this, embodiments of this application provide a network performance measurement method. The method may be applied to an implementation environment shown in FIG. 1. As shown in FIG. 1, the implementation environment includes a plurality of network devices. According to the method provided in embodiments of this application, measurement devices on a measurement path including the plurality of network devices may be actively triggered to measure network performance. The measurement devices not only include an ingress node and an egress node on the measurement path, but also may include at least one intermediate device. In other words, according to the method provided in embodiments of this application, an intermediate device can be actively triggered to measure network performance, so that more comprehensive network performance measurement information can be collected.

For example, the network devices in the embodiment of this application include but are not limited to a router, a switch, a server, and the like. The plurality of network devices such as an RT 1, an RT 2, an RT 3, and an RT 5 shown in FIG. 1 are measurement devices on the measurement path that are for measuring network performance, and servers are a Server 1 and a Server 2 shown in FIG. 1. In addition, the implementation environment further includes a control device. Measurement information obtained by a measurement device by measuring network performance not only may be collected on the network device, but also may be reported to the control device, and the control device performs collection and management.

With reference to the implementation environment shown in FIG. 1, the network performance measurement method provided in embodiments of this application is described by using an example in which a first network device performs the method. As shown in FIG. 2, the method includes but is not limited to the following process.

201: A first network device sends a first active measurement protocol packet to a second network device, where the first active measurement protocol packet includes measurement indication information, the measurement indication information is used to indicate a measurement device on a forward path to measure network performance, the forward path is a forwarding path of the first active measurement protocol packet, the first network device and the second network device are two ends of the forward path, and the measurement device on the forward path includes at least one intermediate device on the forward path.

The first network device may be a sender of the first active measurement protocol packet, and the second network device may be a reflector of the first active measurement protocol packet.

In an example embodiment, before the first network device sends the first Active Measurement Protocol packet to the second network device, the first network device obtains the first Active Measurement Protocol packet. A manner in which the first network device obtains the first active measurement protocol packet is not limited in this embodiment of this application, and includes but is not limited to generating, by the first network device, the first active measurement protocol packet.

The first network device is an ingress node on the forward path, and information about the forward path may be preconfigured on the first network device. For example, an identifier of each network device on the forward path is configured on the first network device, or an identifier of an egress node on the forward path is configured on the first network device, and the first network device computes the forward path based on the identifier of the egress node. Regardless of a case in which the forward path is determined, the first network device obtains the first active measurement protocol packet, so as to actively trigger an intermediate device, serving as a first measurement device, to measure the network performance. The first Active Measurement Protocol packet is forwarded through the forward path, that is, the forward path may be a forwarding path of the first active measurement protocol packet.

For example, the first Active Measurement Protocol packet includes but is not limited to a STAMP packet, an OWAMP packet, or a TWAMP packet.

The measurement indication information is used to indicate a measurement device on the forward path to measure network performance, and the measurement device on the forward path includes at least one intermediate device on the forward path. In other words, the measurement indication information can be used to trigger the intermediate device to measure network performance. A form of the measurement indication information is not limited in this embodiment of this application, and includes but is not limited to the following four cases.

Case 1: The measurement indication information is included in a segment identifier (SID) corresponding to the measurement device on the forward path in a segment list.

In Case 1, the first active measurement protocol packet includes the segment list, and the segment list is used to indicate the forward path. For example, the segment list includes segment identifiers of the network devices on the forward path. If a segment identifier of a network device on the forward path includes the measurement indication information, the network device is a measurement device on the forward path. The segment identifier including the measurement indication information may be a segment identifier of a special type.

For example, the segment identifier including the measurement indication information may be a segment identifier including operation, administration and maintenance (OAM) information. Specifically, the segment identifier including the measurement indication information may be OAM endpoint with punt (End.OP) and OAM endpoint with timestamp and punt (End. OTP).

End.OP is an OAM SID that specifies a timestamp and punt behavior to be implemented for an OAM packet. For example, End.OP is used to indicate the network device to send the first active measurement protocol packet to an OAM process of the control plane after receiving the first active measurement protocol packet. For example, when a network device N receives a data packet whose destination address is S and S is a local End.OP SID, the network device N sends the data packet to an OAM process.

End.OTP is used to indicate an OAM egress node with timestamp and Punt to send, after receiving the first active measurement protocol packet, the first active measurement protocol packet and a corresponding timestamp to an OAM process on the control plane. For example, when a network device N receives a data packet whose destination address is S and S is a local End.OTP SID, the network device N sends the data packet and a corresponding timestamp to an OAM process.

In this embodiment of this application, if an identifier of an intermediate device is End.OP or End.OTP, it indicates that the intermediate device is used as a measurement device on the forward path to measure network performance. That is, in Case 1, when the identifiers of all the intermediate devices on the forward path are all End.OP or End.OTP, all the intermediate devices on the forward path measure network performance. If identifiers of only some of all the intermediate devices on the forward path are End.OP or End.OTP, these intermediate devices on the forward path measure network performance.

Regardless of End.OP or End.OTP, the local OAM process further processes the data packet, which may involve a processing protocol layer above Internet Protocol version 6 (IPv6). For example, a packet internet groper (PING) and a traceroute require the Internet Control Message Protocol (ICMP) or the User Datagram Protocol (UDP) for processing. Once the data packet leaves the IPv6 layer, the processing is considered as host processing, and an upper-layer protocol also requires such processing.

For example, the segment identifier including the measurement indication information may alternatively be of another SID type. A working mode of the segment identifier of another SID type is similar to that of End.OP or End.OTP. The working mode includes but is not limited to: when a routing network device receives a packet, a corresponding sending operation is triggered by the segment identifier including the measurement indication information. For example, an ICMPv6 OAM packet is constructed for a source node device of an original packet, or some pieces of measurement (telemetry) information are sent to a monitoring device. OAM information corresponding to the segment identifier including the measurement indication information is shown in FIG. 3, and includes bits 0 to 15. The bit 0 is used to indicate to record a data packet, that is, a processing device creates a log entry, where the log entry reflects a creation time of the log entry, and further reflects an arrival time of the data packet. The bit 1 is used for data packet counting. For example, a counter is added for the processing device, and the counter records a quantity of data packets. The bit 2 is used to indicate to send ICMPv6 OAM, that is, the processing device sends an ICMP OAM message to the source node device of the data packet based on the bit 2, where the OAM message indicates a packet occurrence time. The bit 3 is used to indicate to send measurement information, that is, the processing device sends the measurement information to the monitoring device, and the measurement information includes the data packet and the arrival time of the data packet. The bits 4 to 15 are reserved.

Case 2: The measurement indication information is included in an IOAM header of IOAM.

In Case 2, the first active measurement protocol packet includes an IOAM trace option header, the IOAM header is also referred to as an IOAM header, and the measurement device on the first measurement device includes an intermediate device having an IOAM measurement capability on the forward path. That the measurement indication information is included in an IOAM header includes: The entire IOAM header is used as the measurement indication information.

In the IOAM manner, the intermediate device can measure network performance. In this embodiment of this application, an IOAM header of IOAM is added to the first active measurement protocol packet, to trigger the intermediate device on the measurement path to measure network performance. The first active measurement protocol packet carries an IOAM header, so that all intermediate devices that receive the first active measurement protocol packet and that have a measurement capability can be used as measurement devices on the forward path to measure network performance, and first measurement information obtained through measurement may be carried in a node data list. For example, if the forward path includes three intermediate devices that have the measurement capability: A, B, and C, the intermediate devices A, B, and C are all used as measurement devices on the forward path.

FIG. 4A shows a format of an IOAM header of IOAM. As shown in FIG. 4A, the IOAM header includes a namespace identifier (Namespace-ID) field, a node length (NodeLen) field, a flags (Flags) field, a remaining length (RemaininggLen) field, an IOAM trace type (IOAM-Trace-Type) field, and a reserved (Reserved) field. Content of the IOAM trace type field is used to indicate a type of data carried in the node data list.

Figures 4B, 5A:
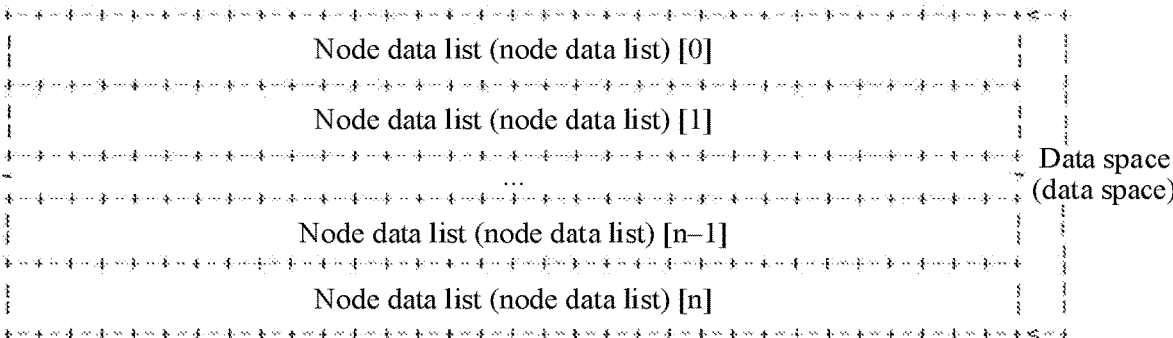
FIG. 4B is a schematic diagram of a structure of a node data list according to an embodiment of this application.
FIG. 5A is a schematic diagram of a structure of a TLV field according to an embodiment of this application.

FIG. 4B shows a format of a node data list. As shown in FIG. 4B, a node data list includes a plurality of node data elements, that is, node data list [0] to node data list [n]. Each node data element is filled in by one measurement device on the forward path, and a process is described below.

Case 3: The measurement indication information includes first indication information and second indication information, where the first indication information is included in an IOAM header, and the second indication information is included in a segment identifier corresponding to the measurement device on the forward path in a segment list.

In Case 3, the first active measurement protocol packet includes the IOAM header and the segment list, and the segment list is used to indicate the forward path. For example, the segment list includes segment identifiers of all the network devices on the forward path.

In Case 3, the first active measurement protocol packet still includes the IOAM header, and the IOAM header includes the first indication information. However, a function of the IOAM header in Case 3 is different from that in Case 2. In Case 2, after receiving the first active measurement protocol packet, an intermediate device with an IOAM measurement capability may trigger, based on the IOAM header, measurement of network performance. However, a difference from Case 2 is that in Case 3, not only the measurement device on the forward path needs to have the IOAM measurement capability, but also the first active measurement protocol packet needs to carry a segment identifier of the network device, and the segment identifier includes the second indication information.

For example, the first active measurement packet includes an IOAM header, the forward path includes three intermediate devices A, B, and C with the IOAM measurement capability, and segment identifiers of two (A and B) of the three intermediate devices with the IOAM measurement capability include the second indication information. In this case, the intermediate devices A and B on the forward path are used as measurement devices on the forward path, and the intermediate device C is not used as a measurement device on the forward path.

Case 4: The measurement indication information is a specific identifier in the active measurement protocol packet. For example, the measurement indication information may be a specific identifier included in a field in a packet header of the active measurement protocol packet. When an intermediate device obtains the specific identifier from the active measurement protocol packet, the intermediate device measures network performance.

In an example embodiment, the first active measurement protocol packet further includes a target field, the target field is used to carry first measurement information, and the first measurement information is obtained by the measurement device on the forward path by measuring network performance based on the measurement indication information.

Optionally, the target field may be a node data list in an IOAM mode. That is, when the measurement indication information is an IOAM header in the IOAM mode, the first measurement information obtained by the measurement device by measuring the network performance may be stored in a corresponding node data list. A format of the node data list is shown in FIG. 4B. As can be seen from FIG. 4B, the node data list includes a plurality of node data elements, that is, node data list [0] to node data list [n], where each node data element is filled in by one measurement device on the forward path. Specifically, each measurement device corresponds to one node data element in the node data list, and first measurement information obtained by each measurement device is stored in a corresponding node data element. Optionally, an arrangement order of the node data elements corresponding to the measurement devices in the node data list is the same as an arrangement order of the measurement devices on the forward path.

Optionally, the target field may be a TLV field, and the TLV field includes but is not limited to the following two forms.

First form: The TLV field includes one TLV field, the TLV field includes at least one sub-type length value field, any one of the at least one sub-type length value field is corresponding to one type of network performance, and any sub-type length value field is used to carry measurement information of a corresponding type of network performance.

For example, types of network performance include but are not limited to one or more types of delay information, jitter information, path information, packet loss information, bandwidth information, and the like. In the first form of the target field, regardless of whether one or more measurement devices exist on the forward path, or whether first measurement information obtained by the measurement device on the forward path by measuring network performance is corresponding to one type of network performance or a plurality of types of network performance, first measurement information obtained by all measurement devices on the forward path through measurement may be carried in one TLV field. The TLV field includes at least one sub-type length value field, and a quantity of the sub-type length value fields is not less than a quantity of types of network performance.

A target field shown in FIG. 5A is used as an example. The target field is an overall HBH OAM-related TLV field extended in a hop-by-hop options header (hop-by-hop options header) in an IPv6 packet header of a packet. The TLV field internally includes a sub-TLV corresponding to a network performance type such as delay information and path information. Measurement information of each type of network performance is carried in a sub-type length value field. For example, network information for a type of network performance such as a delay is carried in a sub-type length value field corresponding to a delay (HBH delay), and the sub-type length value field includes a field length and a value. For example, network information for a type of network performance such as path information is carried in a sub-type length value field corresponding to path information (HBH path), and the sub-type length value field includes a field length (length) and a value (value). Each sub-type length value field has its own field length and value, and a length (LENGTH) in a TLV field is used to indicate a length of the entire TLV field.

Second form: The target field includes at least one TLV field, any one of the at least one TLV field is corresponding to one type of network performance, and any TLV field is used to carry measurement information of a corresponding type of network performance.

For the second form of the target field, if the first measurement information obtained by the measurement device on the forward path by measuring network performance includes measurement information of a plurality of types of network performance, measurement information of each type of network performance is carried in one TLV field, and network information of different types of network performance is carried in different TLV fields.

A target field shown in FIG. 5B is used as an example. The target field is extended TLV corresponding to a plurality of parallel network performance types such as delay information and path information, and measurement information of each type of network performance is carried in one TLV field. For example, measurement information for a type of network performance such as a delay is carried in a TLV field corresponding to a delay (HBH delay), and the TLV field includes a field length (length) and a value (value). For example, measurement information for a type of network performance such as path information is carried in a TLV field corresponding to path information (HBH path), and the TLV field includes a field length (length) and a value (value). For example, FIG. 5C shows a diagram of an example of delay TLV corresponding to the second form of target field.

Whether the first active measurement protocol packet uses the first form of target field or the second form of target field is not limited in embodiments of this application. An intermediate device determines, based on a TLV type included in a packet, how to encapsulate data.

In an example embodiment, the first active measurement protocol packet further includes a measurement type identifier, and the measurement type identifier is used to indicate a type of network performance measured by the measurement device on the forward path. A form of the measurement type identifier is not limited in embodiments of this application, and a location at which the measurement type identifier is carried in the first active measurement protocol packet is not limited either.

In an example embodiment, the first network device is an ingress node on the forward path, and information about the forward path may be preconfigured on the first network device node. For example, if identifiers of all nodes on the forward path are configured on the first network device, the first network device can determine that the egress node on the forward path is the second network device, so as to send the first active measurement protocol packet to the second network device. Alternatively, if an identifier of the egress node on the forward path is configured on the first network device, the first network device can determine the second network device based on the identifier of the egress node, so as to send the first active measurement protocol packet to the second network device.

In addition, regardless of the foregoing manner of determining the egress node on the forward path, to send the first active measurement protocol packet to the second network device, the first network device sends the first active measurement protocol packet to a next-hop intermediate device of the first network device on the forward path.

According to the method provided in this embodiment of this application, the first active measurement protocol packet carries the measurement indication information, to indicate a measurement device on the measurement path to measure network performance. In addition, the measurement device may be an intermediate device on the measurement path. Therefore, the intermediate device can actively measure network performance, so that a range of nodes for measuring network performance is more comprehensive, and obtained measurement information is more comprehensive, thereby meeting a requirement of a large-scale network for performance data collection. In addition, there are a plurality of manners of reporting the measurement information, so that a manner of collecting the measurement information is more flexible.

The network performance measurement method provided in embodiments of this application is described by using an example in which a third network device performs the method. For example, the third network device is an intermediate device that needs to measure network performance on a measurement path. As shown in FIG. 6, the method includes but is not limited to the following processes.

601: The third network device receives a first active measurement protocol packet sent by a first network device to a second network device. The first active measurement protocol packet includes measurement indication information, the measurement indication information is used to indicate a measurement device on a forward path to measure network performance, the forward path is a forwarding path of the first active measurement protocol packet, the first network device and the second network device are two ends of the forward path, the measurement device on the forward path includes at least one intermediate device on the forward path, and the measurement device on the forward path includes the third network device.

The third network device is a network device between the first network device and the second network device, and is an intermediate device on the forward path. The first network device is an ingress node on the forward path, and the second network device is an egress node on the forward path. The third network device may be a next-hop node device of the first network device, and the third network device directly receives the first active measurement protocol packet from the first network device. Optionally, the third network device may not be the next-hop node device of the first network device, and the first active measurement protocol packet received by the third network device is the first active measurement protocol packet that is sent by the first network device and that is forwarded by an intermediate device before the third network device. In either case, an example in which the third network device is a measurement device on the forward path is used for description in this embodiment of this application.

602: The third network device measures network performance based on the measurement indication information to obtain first measurement information, and sends the first measurement information.

Before measuring the network performance based on the measurement indication information to obtain the first measurement information, the third network device needs to first obtain the measurement indication information. Because the measurement indication information in the first active measurement protocol packet has different forms, the third network device may obtain the measurement indication information in a plurality of manners, including but not limited to the following three cases.

Case 1: The measurement indication information is included in a segment identifier corresponding to the measurement device on the forward path in a segment list. The third network device determines that a destination address field in the first active measurement protocol packet includes a local segment identifier and that the local segment identifier includes the measurement indication information.

In Case 1, the first active measurement protocol packet includes the segment list, the segment list is used to indicate the forward path, and the measurement indication information is included in the segment identifier corresponding to the measurement device on the forward path in the segment list. As described in 201, the segment list is carried, in a form of OAM information, in the first active measurement protocol packet. The segment identifier including the measurement indication information may be a segment identifier including the OAM information. In an example, the segment identifier including the measurement indication information may be End.OP and End. OTP.

According to a packet forwarding process of an SR network, segment identifiers corresponding to network devices on the forward path in the segment list are sequentially updated to a destination address (DA) field of an IPv6 packet header of the first active measurement protocol packet. After receiving the first active measurement protocol packet, if a network device on the forward path finds that a segment identifier included in the DA field of the first active measurement protocol packet is a local segment identifier, the network device processes the packet according to an instruction set corresponding to the local segment identifier. Therefore, the third network device may obtain a field identifier of the third network device from the DA field of the first active measurement protocol packet. In addition, if the segment identifier of the third network device includes End.OP or End.OTP, the third network device obtains the measurement indication information from the segment identifier corresponding to the third network device. The measurement indication information is used to indicate the third network device to serve as the measurement device on the forward path to measure network performance.

Case 2: The first active measurement protocol packet includes an IOAM header, and the measurement indication information is included in the IOAM header. The third network device obtains the measurement indication information from the IOAM header, where the third network device is a device with an IOAM measurement capability.

Because the first active measurement protocol packet includes the IOAM header, and the third network device has the IOAM measurement capability, if the first active measurement protocol packet does not carry a segment list, the third network device triggers network performance measurement after receiving the first active measurement protocol packet.

Case 3: The measurement indication information includes first indication information and second indication information, the first active measurement protocol packet includes an IOAM header and a segment list, the first indication information is included in the IOAM header, the segment list is used to indicate the forward path, and the second indication information is included in a segment identifier corresponding to the measurement device on the forward path in the segment list. The third network device obtains the first measurement indication information from the IOAM header, and the third network device obtains the second measurement indication information from the segment identifier corresponding to the third network device.

In Case 3, after receiving the first active measurement protocol packet, the third network device obtains the first measurement indication information from the IOAM header, and obtains the second measurement indication information from the segment identifier corresponding to the third network device in the segment list, so as to trigger the third network device to measure network performance.

Case 4: The measurement indication information is a specific identifier in the active measurement protocol packet. For example, the measurement indication information may be a specific identifier included in a field in a packet header of the active measurement protocol packet. When an intermediate device obtains the specific identifier from the active measurement protocol packet, the intermediate device measures network performance.

Regardless of which of the foregoing cases in which the third network device obtains the measurement indication information, the third network device is triggered to measure network performance to obtain the first measurement information. In an example embodiment, the first active measurement protocol packet further includes a measurement type identifier, and the measurement type identifier is used to indicate a type of network performance measured by the measurement device on the forward path. Therefore, a manner in which the third network device measures network performance based on the measurement indication information to obtain the first measurement information includes but is not limited to: The third network device measures, based on the measurement indication information, the type of network performance indicated by the measurement type identifier, to obtain the first measurement information. Types of network performance include but are not limited to one or more types of delay information, jitter information, path information, packet loss information, bandwidth information, and the like. The delay information may be delay information of a packet inside a network device, or may be delay information of a packet on a network link.

In this embodiment of this application, the measuring, by the third network device, network performance may be obtaining various detection manners of the foregoing plurality of network performance types. For example, when the network performance type is delay information, that the third network device measures network performance may mean that the third network device obtains a timestamp at which the first active measurement protocol packet arrives at the device.

After obtaining the first measurement information through measurement, the third network device sends the first measurement information. For example, a manner in which the third network device sends the first measurement information includes: The third network device uses the first active measurement protocol packet to carry the first measurement information obtained through measurement, and sends, to the second network device, the first active measurement protocol packet carrying the first measurement information.

For example, the third network device uses a node data list or a TLV field of the first active measurement protocol packet to carry the first measurement information obtained through measurement. For example, the node data list includes a format shown in FIG. 4B, and the TLV field includes two forms shown in FIG. 5A and FIG. 5B. The third network device encapsulates the first measurement information based on a form of the TLV field.

A manner in which the first measurement information is sent is not limited in this embodiment of this application. For example, the first active measurement protocol packet does not include the TLV field used to carry the first measurement information, but includes the node data list. The third network device uses the node data list of the first active measurement protocol packet to carry the first measurement information, and sends the first active measurement protocol packet carrying the first measurement information to the second network device.

For another example, if the first active measurement protocol packet does not include the node data list but includes the TLV field used to carry the first measurement information, the third network device uses the TLV field of the first active measurement protocol packet to carry the first measurement information, and sends the first active measurement protocol packet carrying the first measurement information to the second network device.

For another example, if the first active measurement protocol packet includes both the node data list and the TLV field used to carry the first measurement information, the third network device may use the TLV field of the first active measurement protocol packet to carry the first measurement information, or may use the node data list of the first active measurement protocol packet to carry the first measurement information.

Regardless of whether the first measurement information is carried in the node data list or the TLV field, the third network device uses the first active measurement protocol packet to carry the first measurement information, and sends the first active measurement protocol packet to the second network device, and the second network device summarizes all measurement information. Therefore, after the third network device measures network performance based on the measurement indication information, and sends the first measurement information, the method further includes: receiving a second packet sent by the second network device, where the second packet includes first measurement information obtained by first measurement devices on the forward path through measurement based on the first active measurement protocol packet; and sending the second packet to the first network device.

Correspondingly, after the first network device sends the first active measurement protocol packet to the second network device, the method further includes: The first network device receives the second packet sent by the second network device to the first network device, where the second packet includes the first measurement information obtained by the first measurement devices by measuring network performance based on the measurement indication information.

It should be noted that the second packet may be an ordinary packet, provided that the second packet can carry first measurement information that is obtained by all the first measurement devices by measuring network performance based on the measurement indication information. Alternatively, the second packet is a reflected test packet of the first Active Measurement Protocol packet, the second packet further includes reverse indication information, the reverse indication information is used to indicate a measurement device on a reverse path to measure network performance, the reverse path is a forwarding path of the second packet, the second network device and the first network device are two ends of the reverse path, and the measurement device on the reverse path includes at least one intermediate device on the reverse path. That is, the first network device is a sender of the first Active Measurement Protocol packet, and the second network device is a reflector of the first Active Measurement Protocol packet. The second packet is alternatively an Active Measurement Protocol packet. For example, the second packet is a second Active Measurement Protocol packet. Content of the second Active Measurement Protocol packet is similar to content of the first Active Measurement Protocol packet, and further includes but is not limited to reverse indication information. The reverse indication information is used to indicate a measurement device, on a reverse path, that receives the second Active Measurement Protocol packet to measure network performance.

In this case, the measurement device on the reverse path is the same as the measurement device on the forward path, or the measurement device on the reverse path is different from the measurement device on the forward path. After the third network device receives the first Active Measurement Protocol packet sent by the first network device to the second network device, the third network device receives the second Active Measurement Protocol packet sent by the second network device; the third network device measures network performance based on the reverse indication information, to obtain second measurement information; and the third network device sends the second measurement information.

For example, after receiving the second Active Measurement Protocol packet, the third network device measures network performance, uses the second Active Measurement Protocol packet to carry the obtained second measurement information, and sends the second Active Measurement Protocol packet along the reverse path.

For example, the second Active Measurement Protocol packet not only includes the second measurement information obtained by the measurement device on the reverse path by measuring network performance based on the reverse indication information, but also includes the first measurement information obtained by the measurement device on the forward path by measuring network performance based on the measurement indication information.

Correspondingly, after the first network device sends the first Active Measurement Protocol packet to the second network device, the method further includes: The first network device receives the second Active Measurement Protocol packet sent by the second network device, where the second Active Measurement Protocol packet includes the second measurement information obtained by the measurement device on the reverse path by measuring network performance. Optionally, the second Active Measurement Protocol packet further includes the first measurement information obtained by the measurement device on the forward path by measuring network performance.

In an example embodiment, after the first network device receives the second packet sent by the second network device, the method further includes that the first network device obtains a network performance measurement result based on the first measurement information. In an example, the first network device collects statistics on and manages network performance. In addition, if the second packet is the second Active Measurement Protocol packet, and the second Active Measurement Protocol packet includes the first measurement information and the second measurement information, the first network device may obtain a network performance measurement result based on the first measurement information and the second measurement information.

In an example embodiment, after the first network device receives the second packet sent by the second network device, the method further includes that the first network device sends the first measurement information to a control device. The first measurement information is sent to the control device, so that the control device performs statistics collection and management on network performance. In addition, if the second packet is the second Active Measurement Protocol packet, and the second Active Measurement Protocol packet includes the first measurement information and the second measurement information, the first network device may send the first measurement information and the second measurement information to the control device.

In an example embodiment, the third network device may alternatively directly report the first measurement information obtained through measurement to the control device. For example, that the third network device measures network performance based on the measurement indication information, to obtain the first measurement information, and sends the first measurement information includes: measuring network performance based on the measurement indication information, to obtain the first measurement information, and sending the first measurement information to the control device. That is, each measurement device does not transfer first measurement information obtained through measurement to a next hop until the egress node, so that the first measurement information is summarized by the egress node. Instead, each measurement device separately reports the first measurement information to the control device. During implementation, a manner used by the third network device to send the first measurement information is not limited in this embodiment of this application.

Similarly, after obtaining the second measurement information through measurement, the third network device may alternatively directly report the second measurement information to the control device. That is, each measurement device does not transfer second measurement information obtained through measurement to a next hop until the egress node, but separately reports the second measurement information to the control device. During implementation, a manner used by the third network device to send the second measurement information is not limited in this embodiment of this application.

According to the method provided in this embodiment of this application, the first Active Measurement Protocol packet carries the measurement indication information, to indicate a measurement device on the measurement path to measure network performance. In addition, the measurement device is an intermediate device on the measurement path. Therefore, the intermediate device can actively measure network performance, so that a range of nodes for measuring network performance is more comprehensive, and obtained measurement information is more comprehensive, thereby meeting a requirement of a large-scale network for performance data collection. In addition, there are a plurality of manners of reporting the measurement information, so that a manner of collecting the measurement information is more flexible. In addition, according to the method provided in this embodiment of this application, measurement on a round-trip path can be further implemented, and a measurement manner is more flexible and comprehensive.

Figure 7:
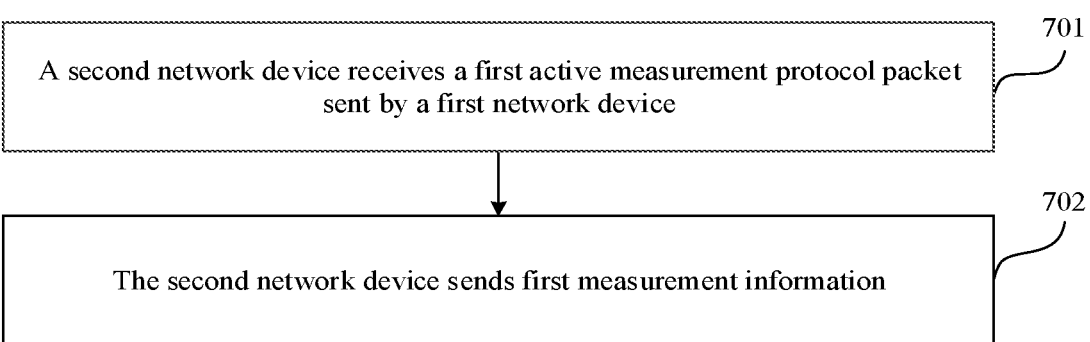
FIG. 7 is a flowchart of a network performance measurement method according to an embodiment of this application.

The network performance measurement method provided in embodiments of this application is described by using an example in which a second network device performs the method. As shown in FIG. 7, the method includes but is not limited to the following processes.

701: The second network device receives a first active measurement protocol packet sent by a first network device.

The second network device is an egress node on a forward path, and the first active measurement protocol packet that is received by the second network device and that is sent by the first network device may be forwarded by an intermediate device. Because the first Active Measurement Protocol packet includes measurement indication information, and the measurement indication information is used to indicate a measurement device on the forward path to measure network performance, the measurement device on the forward path measures network performance based on the measurement indication information. The measurement device on the forward path includes at least one intermediate device on the forward path. The first Active Measurement Protocol packet further includes first measurement information obtained by the measurement device on the forward path by measuring network performance based on the measurement indication information. The first network device is an ingress node on the forward path, and the second network device is the egress node on the forward path.

In a case in which the measurement device on the forward path uses the first Active Measurement Protocol packet to carry the first measurement information obtained through measurement, the second network device may obtain the first measurement information after receiving the first Active Measurement Protocol packet.

702: The second network device sends the first measurement information.

After obtaining the first measurement information obtained by the measurement device on the forward path through measurement, the second network device sends the first measurement information. Manners of sending the first measurement information include but are not limited to the following two types.

Manner 1: The second network device uses a second packet to carry the first measurement information, and sends the second packet to the first network device.

Optionally, the second packet is an ordinary packet, provided that the second packet can carry first measurement information that is obtained by all measurement devices on the forward path by measuring network performance based on the measurement indication information.

Optionally, the second packet is also an Active Measurement Protocol packet. Specifically, the first network device is a sender of the first Active Measurement Protocol packet, and the second network device is a reflector of the first Active Measurement Protocol packet. After receiving the first Active Measurement Protocol packet, the second network device generates a reflected test packet of the first active measurement protocol packet, that is, the second packet, and sends the reflected test packet to the first network device. The reverse path is a forwarding path of the reflected test packet, the second network device and the first network device are two ends of the reverse path, and a measurement device on the reverse path includes at least one intermediate device on the reverse path. Second measurement information obtained by the measurement device on the reverse path by measuring network performance may be carried in the reflected test packet.

For example, in this case, the second Active Measurement Protocol packet not only includes the first measurement information obtained by the measurement device on the forward path by measuring network performance based on the measurement indication information, but also includes the second measurement information obtained by the measurement device on the reverse path by measuring network performance based on the reverse indication information.

The second measurement information may be carried in two manners.

In a first manner, the second measurement information is carried in a node data list of the reflected test packet. In this case, content of the reflected test packet is similar to that of the first active measurement protocol packet, and the reflected test packet also includes an IOAM header and a node data list in an IOAM mode. Formats of the IOAM header and the node data list are shown in FIG. 4A and FIG. 4B respectively.

Figure 8A:
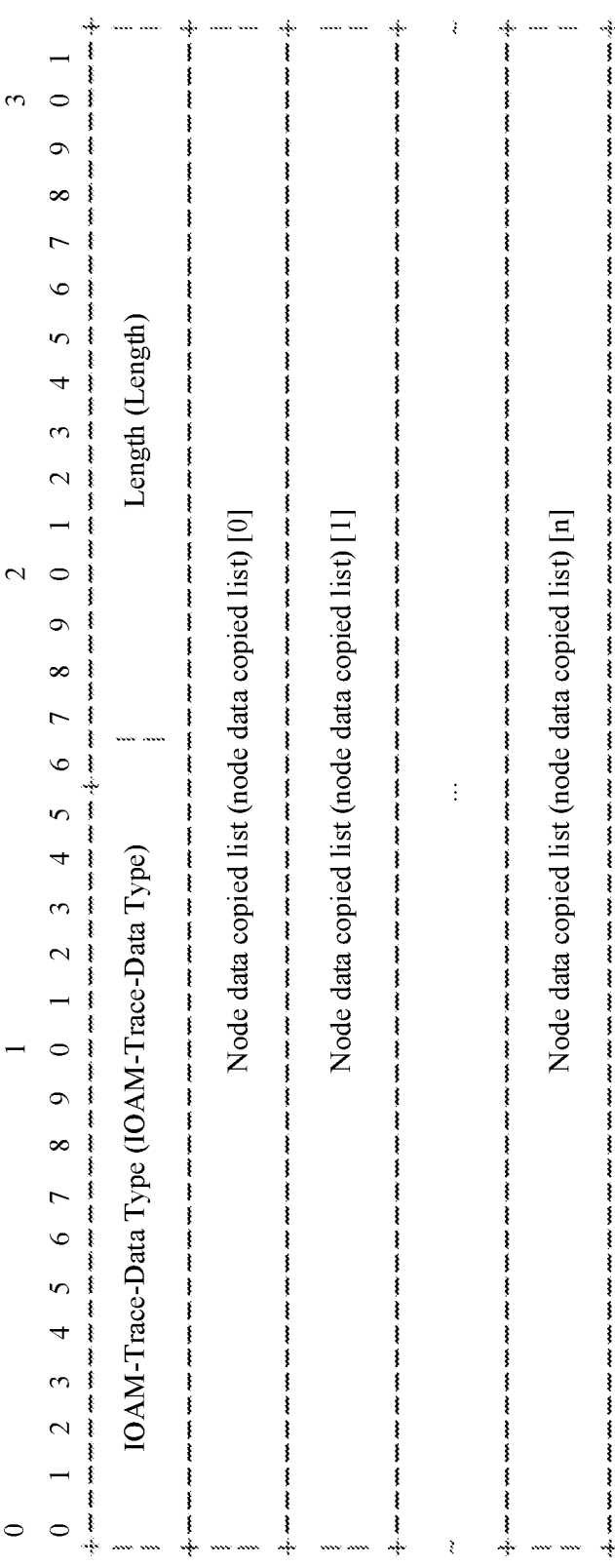
FIG. 8A is a schematic diagram of a structure of a TLV field according to an embodiment of this application.

In this case, the first measurement information is carried in an IOAM TLV field of the reflected test packet. A format of the IOAM TLV field is shown in FIG. 8A. The IOAM TLV field includes an IOAM-Tracing-Data Type field, a length field, and a node data copied list. The node data copied list is used to store copied content of the node data list. That is, in a process of generating the reflected test packet, the second network device copies content in the node data list of the first active test protocol packet to the node data copied list of the reflected test packet, so that the reflected test packet carries the first measurement information. Further, when the measurement device on the reverse path measures a network and obtains the second measurement information, the second measurement information may be added to the node data list of the reflected test packet. In this way, the reflected test packet carries both the first measurement information and the second measurement information.

In a second manner: The second measurement information is carried in a reverse TLV field of the reflected test packet.

Figure 8B:
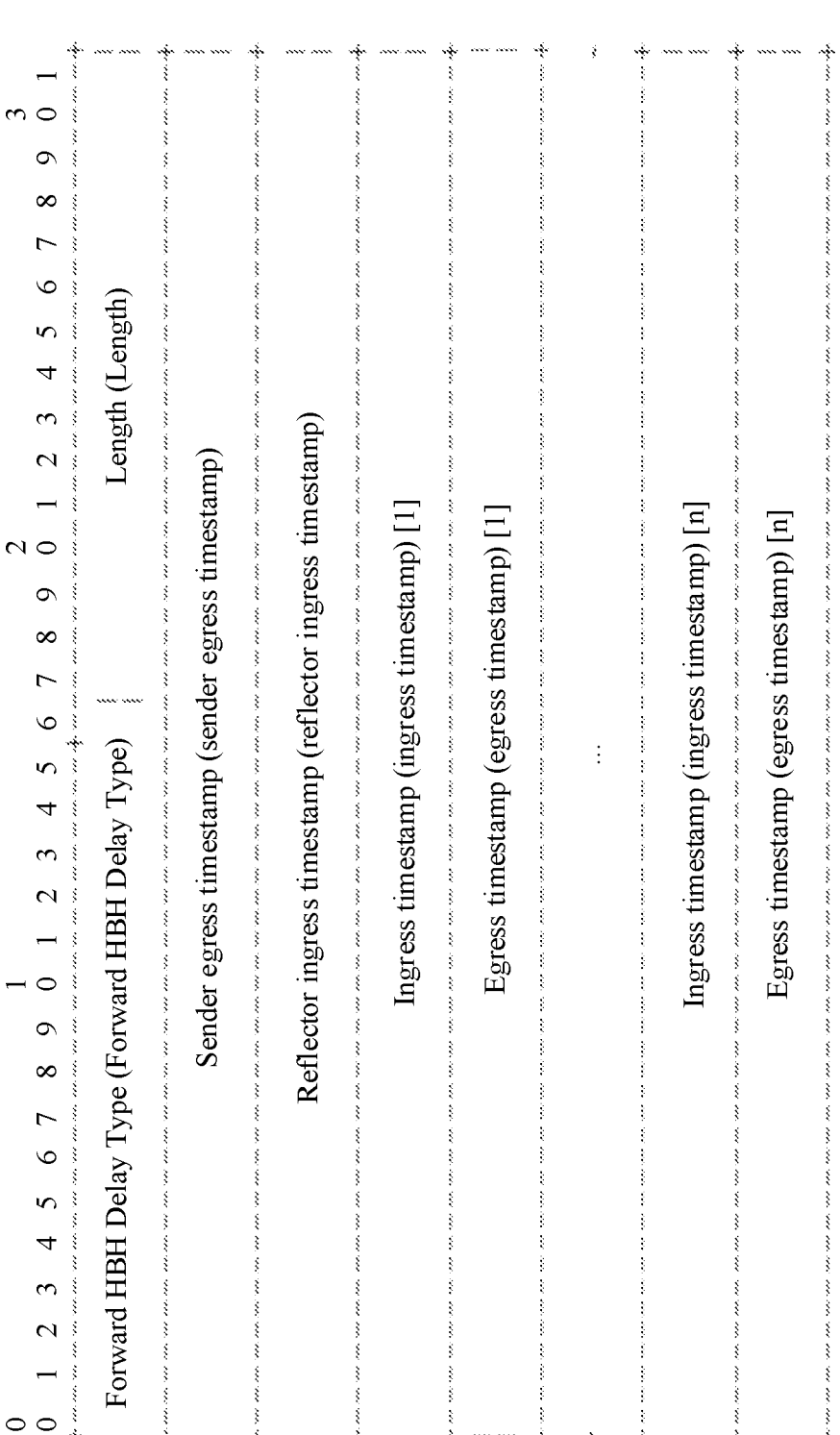
FIG. 8B is a schematic diagram of a structure of a TLV field according to an embodiment of this application.

In this case, fields in the active measurement packet that are used to carry measurement information include two types: a forward TLV field and the reverse TLV field. The forward TLV field is used to carry the first measurement information, and a format of the forward TLV field is shown in FIG. 8B. The reverse TLV field is used to carry the second measurement information, and a format of the reverse TLV field is shown in FIG. 8C. That is, in a process of generating the reflected test packet, the second network device copies content in a forward TLV field of the first active test protocol packet to the forward TLV field of the reflected test packet, so as to carry the first measurement information in the reflected test packet. Further, when the measurement device on the reverse path measures a network and obtains the second measurement information, the second measurement information may be added to the reverse TLV field of the reflected test packet. In this way, the reflected test packet carries both the first measurement information and the second measurement information.

Optionally, both the forward TLV field and the reverse TLV field may comply with the formats of the foregoing target field, that is, the formats shown in FIG. 5A to FIG. 5C.

For example, the second network device sends the second Active Measurement Protocol packet to the third network device. After receiving the second a Active Measurement Protocol packet, the third network device measures network performance to obtain the second measurement information, uses the second Active Measurement Protocol packet to carry the second measurement information, and sends the second active measurement protocol packet along the reverse path until the second Active Measurement Protocol packet is sent to the first network device. The second Active Measurement Protocol packet received by the first network device includes the first measurement information obtained by all the measurement devices on the forward path through measurement and the second measurement information obtained by the measurement device on the reverse path through measurement. The measurement device on the forward path may be the same as or different from the measurement device on the reverse path.

It should be noted that the second Active Measurement Protocol packet further includes third measurement information obtained by the second network device by measuring network performance based on the measurement indication information.

In this case, the second network device sends the second Active Measurement Protocol packet to a next-hop intermediate device on the reverse path, and the second Active Measurement Protocol packet includes the first measurement information obtained by the measurement device on the forward path through measurement. Each measurement device, on the reverse path, that receives the second Active Measurement Protocol packet triggers, based on the reverse indication information, measurement of network performance, and uses the second Active Measurement Protocol packet to carry second measurement information obtained through measurement.

For example, the second active measurement packet may alternatively include a target field, and the second measurement information is carried by using the target field. For a description of content of the target field, refer to the related description in 201. Details are not described herein again.

In addition, similar to the measurement indication information, the reverse indication information may also be included in a segment list or an IOAM header. Details are not described again in this embodiment of this application.

Manner 2: The second network device reports the first measurement information to the control device.

The second network device reports the first measurement information to the control device, and the control device collects statistics on and manages network performance. For example, the second network device may further report, to the control device, the third measurement information obtained by the second network device by measuring network performance based on the measurement indication information.

According to the method provided in this embodiment of this application, the first Active Measurement Protocol packet carries the measurement indication information, to indicate a measurement device on the measurement path to measure network performance. In addition, the measurement device may be an intermediate device on the measurement path. Therefore, the intermediate device can actively measure network performance, so that a range of nodes for measuring network performance is more comprehensive, and obtained measurement information is more comprehensive, thereby meeting a requirement of a large-scale network for performance data collection. In addition, there are a plurality of manners of sending measurement information, so that a manner of collecting the measurement information is more flexible. In addition, according to the method provided in this embodiment of this application, measurement on a round-trip path can be further implemented, and reported measurement information is more comprehensive.

Figure 9:
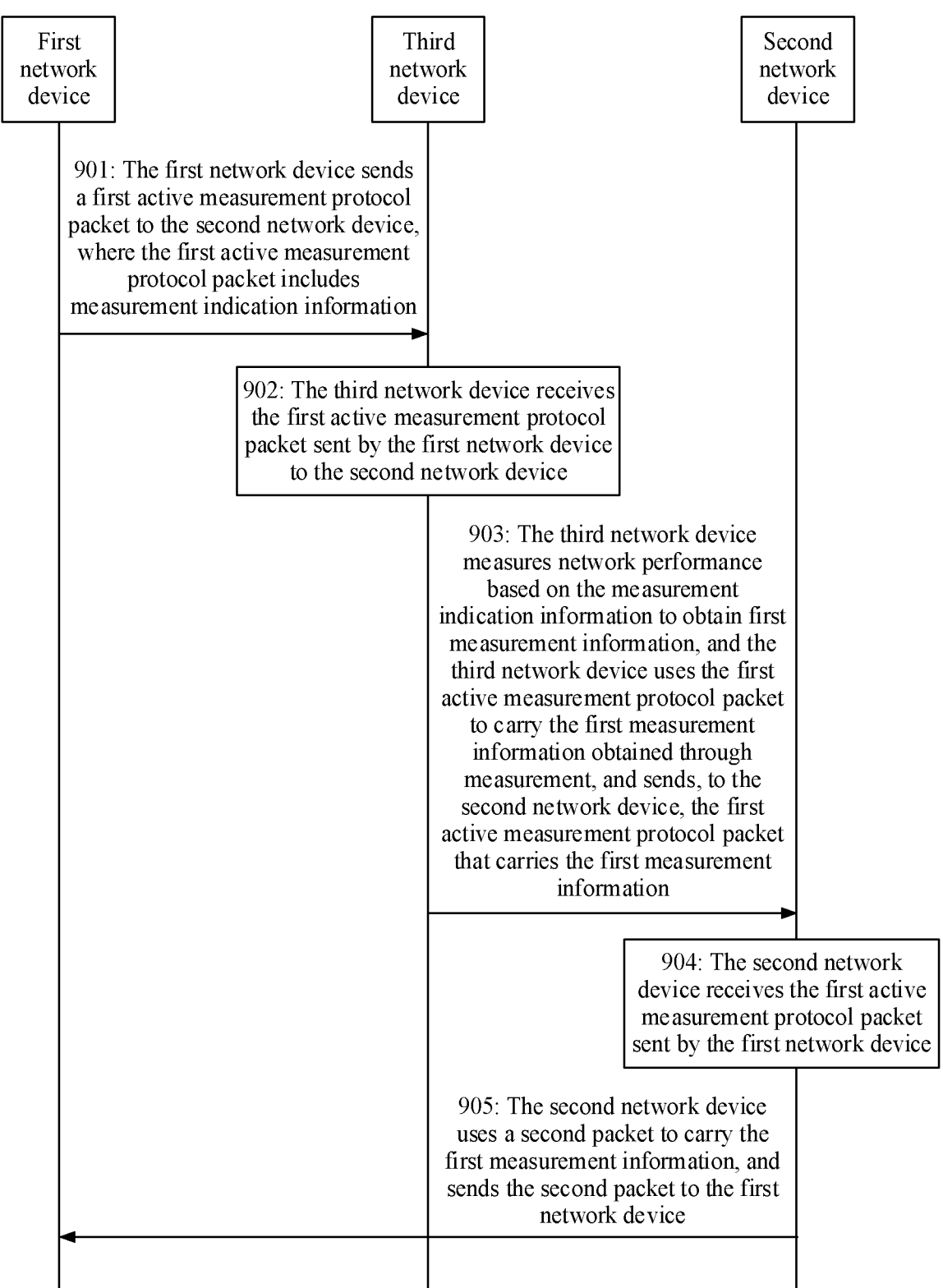
FIG. 9 is a schematic diagram of interaction of a network performance measurement method according to an embodiment of this application.

An embodiment of this application provides a network performance measurement method. As shown in FIG. 9, the method includes the following processes.

901: A first network device sends a first Active Measurement Protocol packet to a second network device, where the first Active Measurement Protocol packet includes measurement indication information, the measurement indication information is used to indicate a measurement device on a forward path to measure network performance, the measurement device on the forward path includes at least one intermediate device on the forward path, the first network device is an ingress node on the forward path, and the second network device is an egress node on the forward path.

For an implementation of 901, refer to the related description of 201. Details are not described herein again.

902: A third network device receives the first Active Measurement Protocol packet sent by the first network device to the second network device.

For an implementation of 902, refer to the related description of 601. Details are not described herein again.

903: The third network device measures network performance based on the measurement indication information to obtain first measurement information, and the third network device uses the first Active Measurement Protocol packet to carry the first measurement information obtained through measurement, and sends, to the second network device, the first Active Measurement Protocol packet that carries the first measurement information.

For an implementation of 903, refer to the related description of 602. Details are not described herein again.

904: The second network device receives the first Active Measurement Protocol packet sent by the first network device.

For an implementation of 904, refer to the related description of 701. Details are not described herein again.

905: The second network device uses a second packet to carry the first measurement information, and sends the second packet to the first network device.

For an implementation of 905, refer to the related description of 702. Details are not described herein again.

Figure 10A:
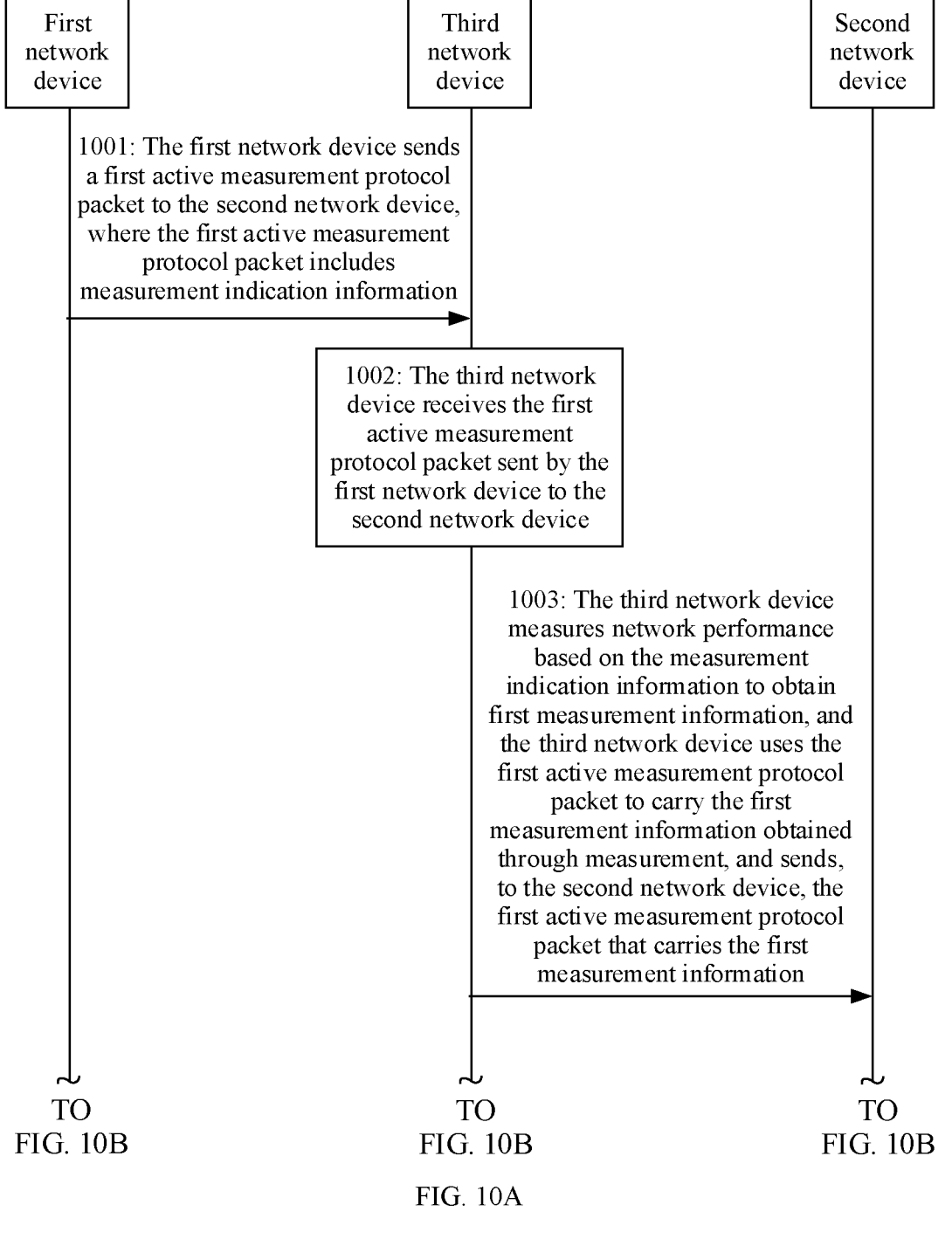
FIG. 10A and FIG. 10B are a schematic diagram of interaction of a network performance measurement method according to an embodiment of this application.
Figure 10B:
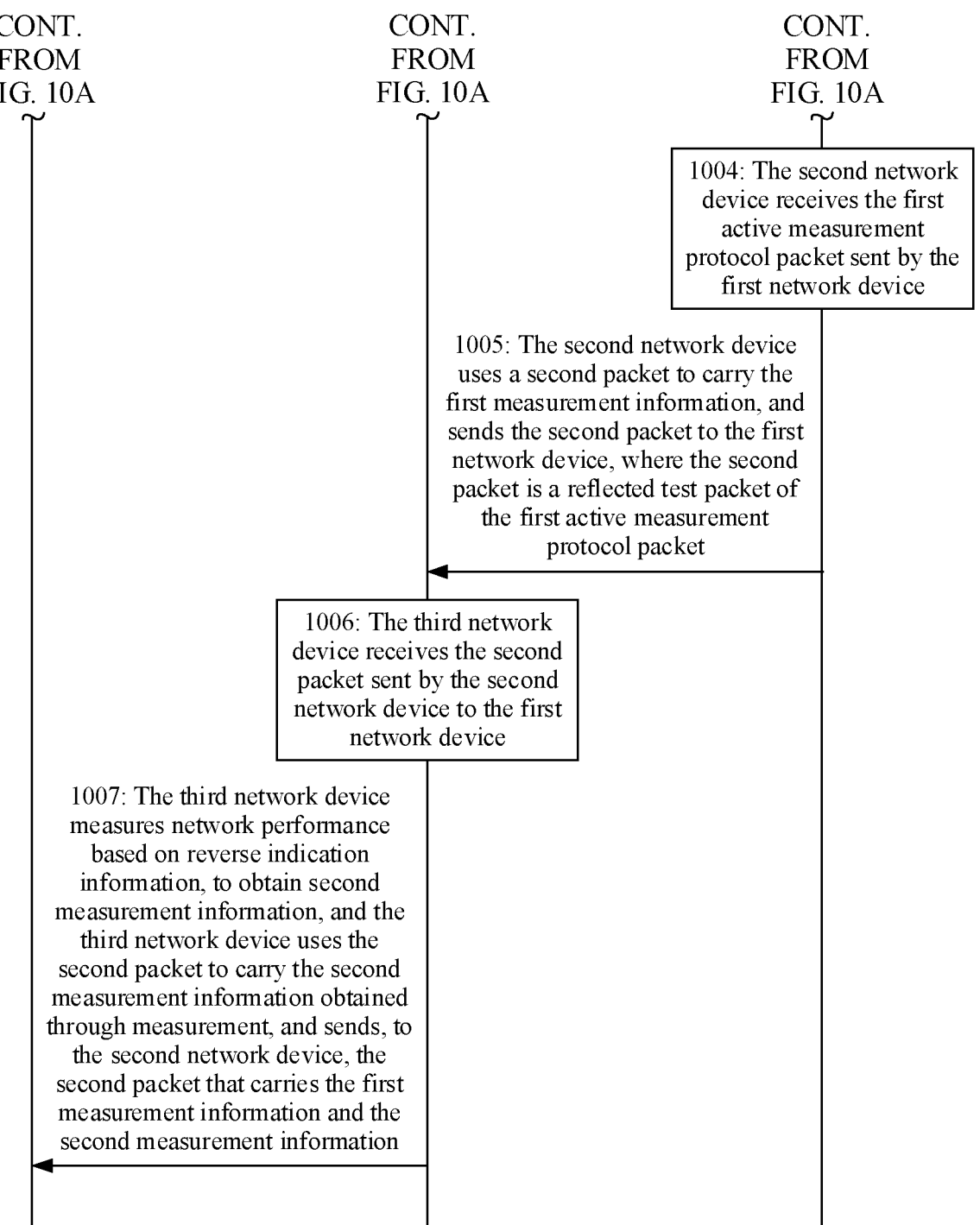

An embodiment of this application provides a network performance measurement method. As shown in FIG. 10A and FIG. 10B, the method includes the following processes.

1001: A first network device sends a first Active Measurement Protocol packet to a second network device, where the first Active Measurement Protocol packet includes measurement indication information, the measurement indication information is used to indicate a measurement device on a forward path to measure network performance, the measurement device on the forward path includes at least one intermediate device on the forward path, the first network device is an ingress node on the forward path, and the second network device is an egress node on the forward path.

For an implementation of 1001, refer to the related description of 201. Details are not described herein again.

1002: A third network device receives the first Active Measurement Protocol packet sent by the first network device to the second network device.

For an implementation of 1002, refer to the related description of 601. Details are not described herein again.

1003: The third network device measures network performance based on the measurement indication information to obtain first measurement information, and the third network device uses the first Active Measurement Protocol packet to carry the first measurement information obtained through measurement, and sends, to the second network device, the first Active Measurement Protocol packet that carries the first measurement information.

For an implementation of 1003, refer to the related description of 602. Details are not described herein again.

1004: The second network device receives the first Active Measurement Protocol packet sent by the first network device.

For an implementation of 1004, refer to the related description of 701. Details are not described herein again.

1005: The second network device uses a second packet to carry the first measurement information, and sends the second packet to the first network device, where the second packet is a reflected test packet of the first Active Measurement Protocol packet.

For an implementation of 1005, refer to the related description of 702. Details are not described herein again.

1006: The third network device receives the second packet sent by the second network device to the first network device.

1007: The third network device measures network performance based on reverse indication information, to obtain second measurement information, and the third network device uses the second packet to carry the second measurement information obtained through measurement, and sends, to the second network device, the second packet that carries the first measurement information and the second measurement information.

For implementations of 1006 and 1007, refer to related descriptions in the embodiment shown in FIG. 6. Details are not described herein again.

Figure 11A:
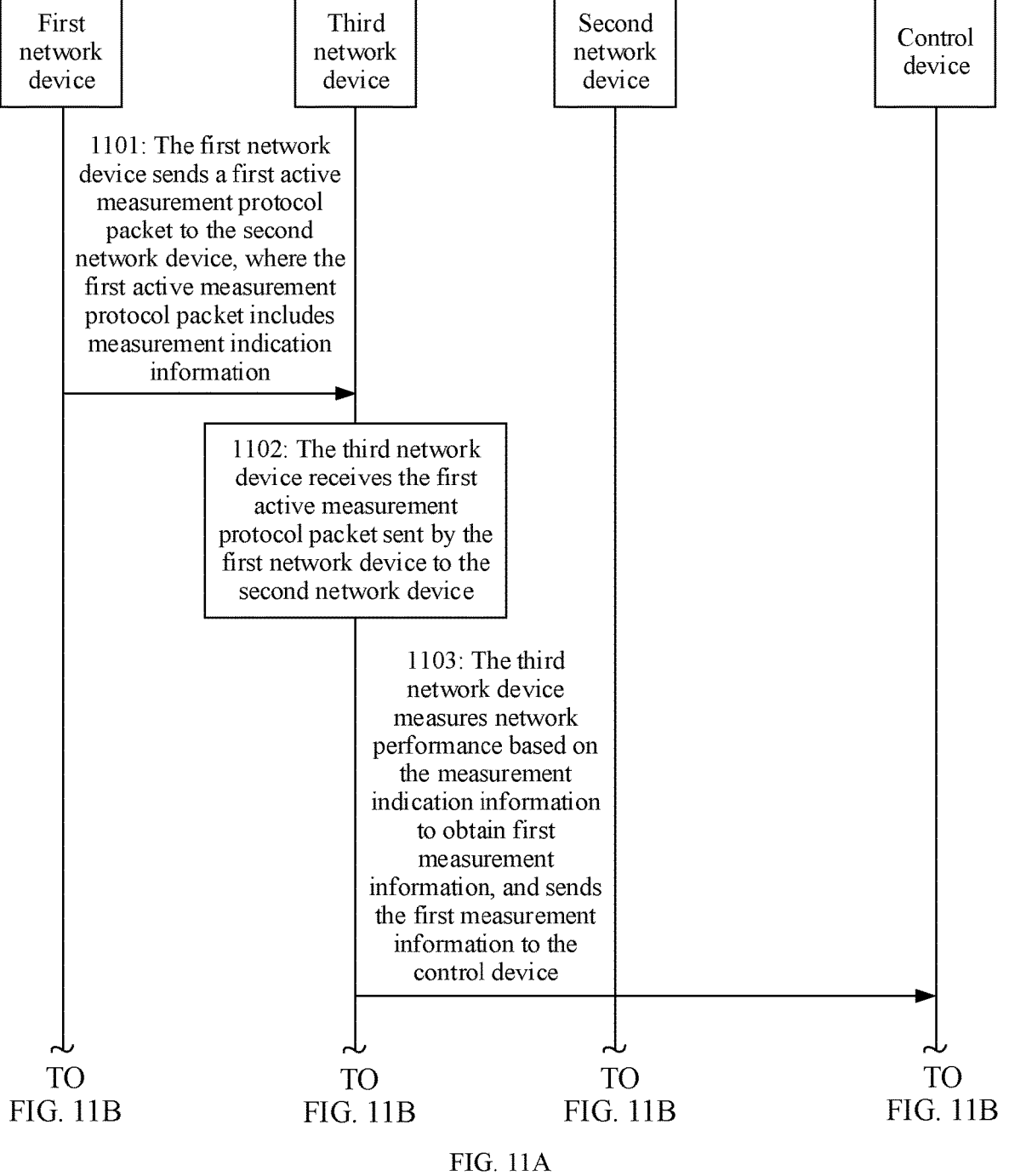
FIG. 11A and FIG. 11B are a schematic diagram of interaction of a network performance measurement method according to an embodiment of this application.
Figure 11B:
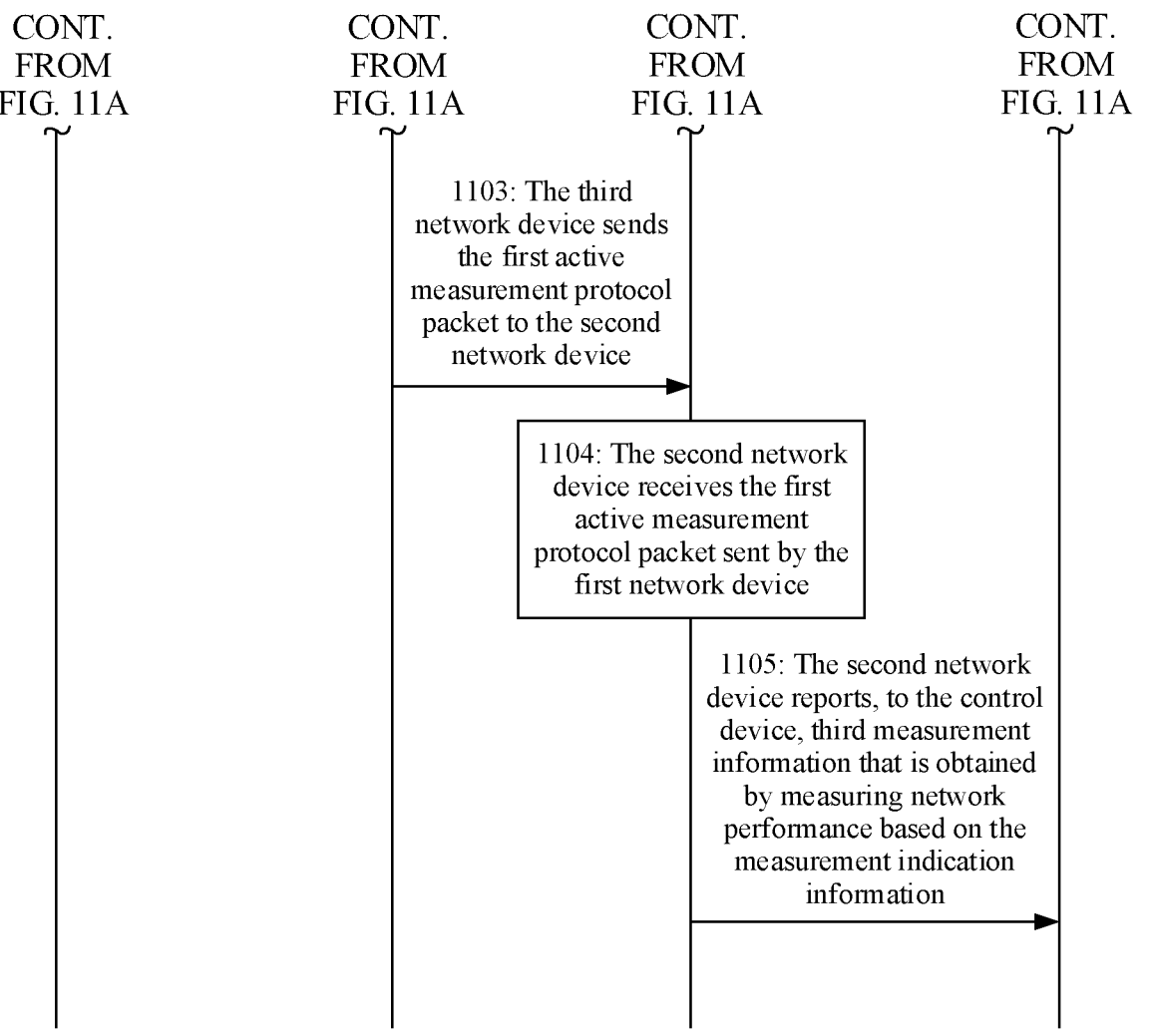

An embodiment of this application provides a network performance measurement method. As shown in FIG. 11A and FIG. 11B, the method includes the following processes.

1101: A first network device sends a first Active Measurement Protocol packet to a second network device, where the first Active Measurement Protocol packet includes measurement indication information, the measurement indication information is used to indicate a measurement device on a forward path to measure network performance, the measurement device on the forward path includes at least one intermediate device on the forward path, the first network device is an ingress node on the forward path, and the second network device is an egress node on the forward path.

For an implementation of 1101, refer to the related description of 201. Details are not described herein again.

1102: A third network device receives the first Active Measurement Protocol packet sent by the first network device to the second network device.

For an implementation of 1102, refer to the related description of 601. Details are not described herein again.

1103: The third network device measures network performance based on the measurement indication information to obtain first measurement information, sends the first measurement information to a control device, and sends the first Active Measurement Protocol packet to the second network device.

For an implementation of 1103, refer to the related description of 602. Details are not described herein again.

1104: The second network device receives the first Active Measurement Protocol packet sent by the first network device.

For an implementation of 1104, refer to the related description of 701. Details are not described herein again.

1105: The second network device reports, to the control device, third measurement information that is obtained by measuring network performance based on the measurement indication information.

For an implementation of 1105, refer to the related description of 702. Details are not described herein again.

Figure 12A:
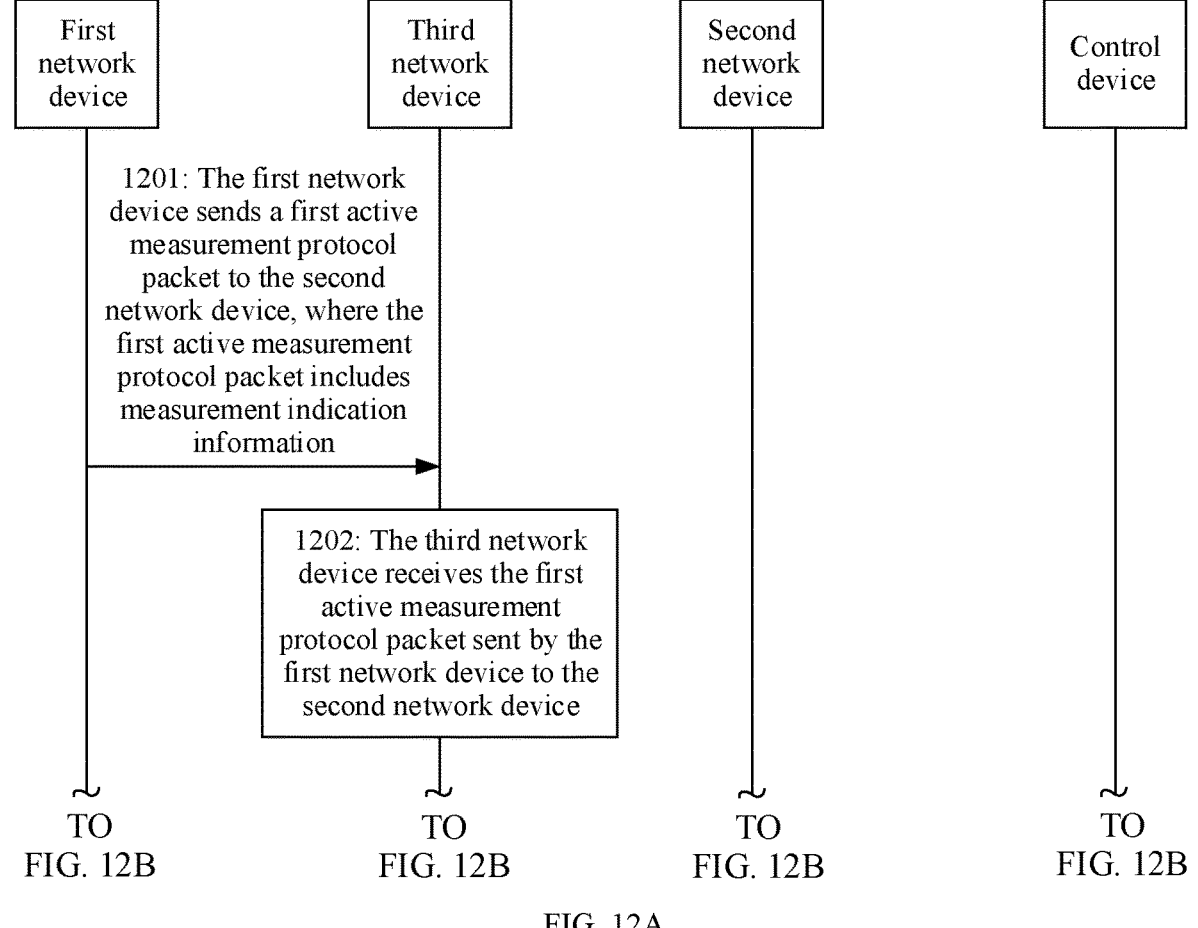

An embodiment of this application provides a network performance measurement method. As shown in FIG. 12A and FIG. 12B, the method includes the following processes.

1201: A first network device sends a first Active Measurement Protocol packet to a second network device, where the first Active Measurement Protocol packet includes measurement indication information, the measurement indication information is used to indicate a measurement device on a forward path to measure network performance, the measurement device on the forward path includes at least one intermediate device on the forward path, the first network device is an ingress node on the forward path, and the second network device is an egress node on the forward path.

For an implementation of 1201, refer to the related description of 201. Details are not described herein again.

1202: A third network device receives the first Active Measurement Protocol packet sent by the first network device to the second network device.

For an implementation of 1202, refer to the related description of 601. Details are not described herein again.

1203: The third network device measures network performance based on the measurement indication information to obtain first measurement information, and the third network device uses the first Active Measurement Protocol packet to carry the first measurement information obtained through measurement, and sends, to the second network device, the first Active Measurement Protocol packet that carries the first measurement information.

For an implementation of 1203, refer to the related description of 602. Details are not described herein again.

1204: The second network device receives the first Active Measurement Protocol packet sent by the first network device.

For an implementation of 1204, refer to the related description of 701. Details are not described herein again.

1205: The second network device reports the first measurement information to a control device.

For an implementation of 1205, refer to the related description of 702. Details are not described herein again.

The following uses the following several scenarios as examples to describe the method provided in embodiments of this application.

Figure 13:
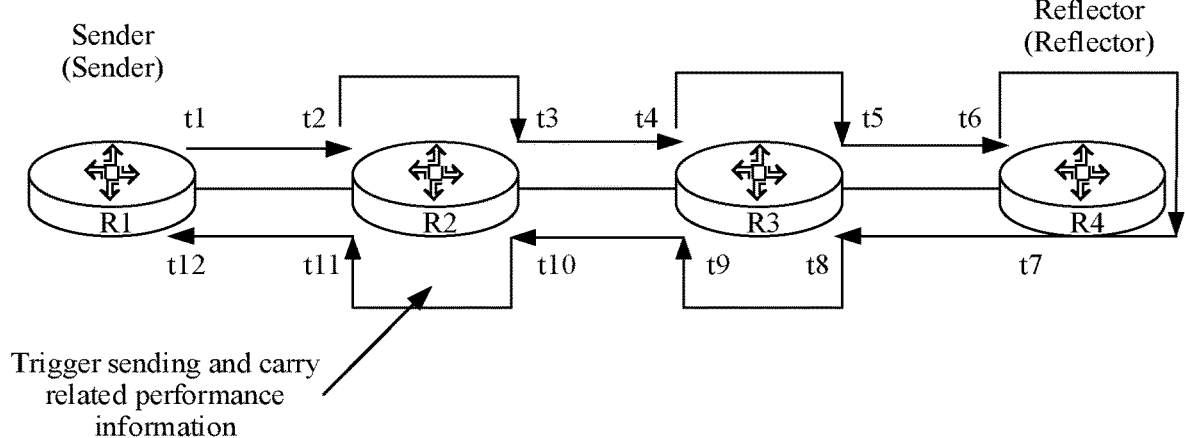
FIG. 13 is a schematic diagram of interaction of a network performance measurement method according to an embodiment of this application.

An example in which delay data of each hop is collected in the scenario shown in FIG. 13 is used for description. The network performance measurement method includes but is not limited to the following processes.

1301: A first network device, that is, a sender, obtains a first Active Measurement Protocol packet, for example, the first Active Measurement Protocol packet is a STAMP packet; and inserts an HBH OAM TLV related to to-be-measured performance into an option TLV part of the STAMP packet. The HBH OAM TLV is a target field used to carry measurement information, and the target field is a TLV field. A form of the target field is shown in FIG. 5A or FIG. 5B. The STAMP packet includes measurement indication information. For example, the measurement indication information is included in a segment identifier.

1302: A third network device (which is a measurement device selected from intermediate devices on a forward path) sends corresponding node information and the STAMP packet to a control plane based on any trigger condition, for example, the measurement indication information in the STAMP packet.

1303: A control plane OAM process encapsulates the first measurement information based on the OAM TLV type carried in the STAMP packet, and modifies a length of the TLV. Then, the third network device sends the STAMP packet encapsulated with the first measurement information to a next-hop intermediate device until the STAMP packet is sent to an egress node.

If an intermediate device between the third network device and the egress node is not a measurement device, the intermediate device directly forwards the received STAMP packet. If an intermediate device between the third network device and the egress node is a measurement device, the intermediate device uses a processing manner of the third network device to measure network performance, and encapsulates first measurement information obtained through measurement into the STAMP packet for further sending.

1304: When receiving the STAMP packet sent by the sender, a second network device, that is, a reflector, copies the OAM TLV part carried in the STAMP packet to a second (reply) packet, and sends the second packet to the sender.

The second packet is a non-Active Measurement Protocol packet. The second packet carries the first measurement information, and is sequentially sent by intermediate devices between the second network device and the first network device until the second packet is sent to the first network device, that is, the sender.

1305: After receiving the second packet, the sender parses the OAM TLV in the second packet and the performance related part in the original STAMP packet, which are processed by the local node or sent to a controller.

Figure 14:
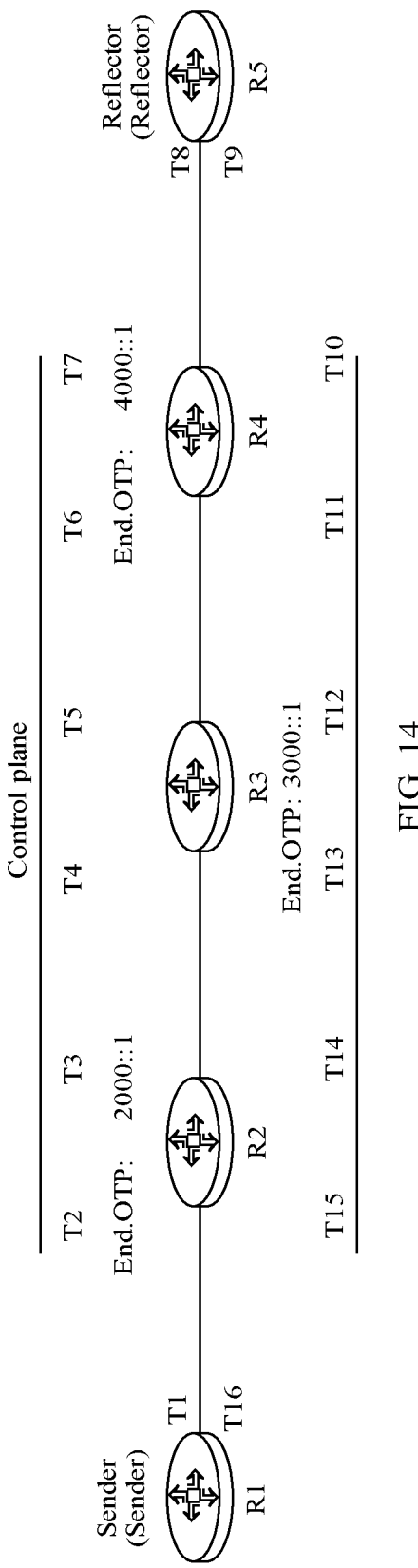
FIG. 14 is a schematic diagram of interaction of a network performance measurement method according to an embodiment of this application.

An example in which delay information of each link on a candidate path, in two directions: R1 to R5 and R5 to R1, of an SR Policy is collected in a scenario in which delay information is transmitted hop by hop on an SR path shown in FIG. 14 is used to describe the network performance measurement method. The method includes but is not limited to the following processes.

1401: A first network device, that is, a sender (Sender) R1, obtains a STAMP packet, that is, a first packet, where a segment list <2000::1, 3000::1, 4000::1> used for indicating a forward path is encapsulated in an SRH of the STAMP packet, an OAM TLV and a Path TLV are carried in an extended TLV part of the STAMP packet, and the Path TLV is used to record a reverse path, that is, reverse path information <4000::1, 3000::1, 2000::1>. 2000::1, 3000::1, and 4000::1 each are a segment identifier including End.OTP. Therefore, nodes R2, R3, and R4 corresponding to 2000::1, 3000::1, and 4000::1 are all measurement devices on the forward path. Similarly, the nodes R2, R3, and R4 are also measurement devices on the reverse path.

1402: The sender sends the STAMP packet to a second network device, that is, a reflector (Reflector) R5. The packet sent to the egress node passes through nodes R2, R3, and R4 in sequence. Because End.OTP SIDs are encapsulated in the STAMP packet, forwarding planes of the nodes R2, R3, and R4 add receiving timestamps to the original packet and send the original packet to control planes (a control plane of each device), and an OAM process on the control plane copies timestamp data to the OAM TLV, so that timestamp information T2 to T7 is collected. For example, delay information of the packet inside R2 may be obtained by comparing T2 with T3, and delay information of the packet on the network link between R2 and R3 may be obtained by comparing T3 with T4.

1403: The reflector (that is, R5) records a receiving time T8 when receiving the STAMP packet, generates a second packet, which is also referred to as a reply packet, copies content of the OAM TLV in the first packet to the second packet, sends the second packet to the sender, and records a sending time T9.

1404: Process the second packet in a manner that is consistent with a processing manner of the STAMP packet sent by the sender, to obtain timestamp information T10 to T15.

1405: The sender receives the second packet, records a receiving time T16, and may extract timestamp information T1 to T15 from the second packet. These values may be used to calculate network delay information.

According to the network performance measurement method in the embodiment shown in FIG. 14, an intermediate device on the measurement path can measure network performance without a need to configure an instance for each link. Therefore, the method provided in this embodiment is easier to manage compared with a manner of using a STAMP packet and a TWAMP packet that do not carry measurement indication information.

Figure 15:
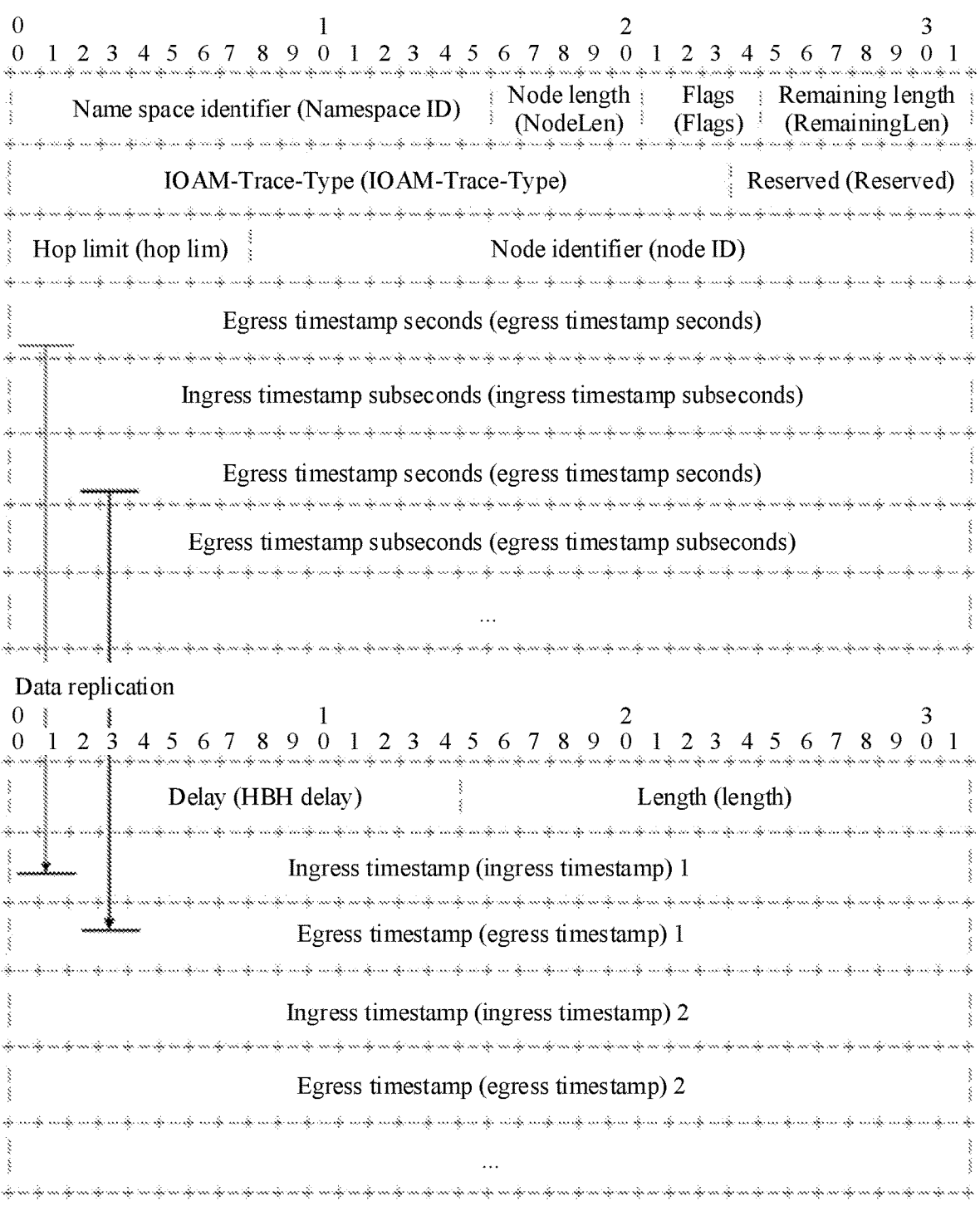
FIG. 15 is a schematic diagram of a structure of a packet according to an embodiment of this application.

The network performance measurement method provided in embodiments of this application is described by using an example in which measurement of an intermediate device is completed with reference to an IOAM measurement capability, that is, based on a STAMP packet and an IOAM header. In this method, an HBH OAM-related TLV is extended in the STAMP packet to carry performance information of an intermediate device. A format of the HBH OAM-related TLV is consistent with that in the embodiment shown in FIG. 13, and a main difference lies in that the extended TLV in this embodiment is mainly used to carry, during a return trip, first measurement information obtained through measurement on a forward trip. As shown in FIG. 13, the forward trip includes a forward path formed by R1, R2, R3, and R4, and the return trip includes a reverse path formed by R4, R3, R2, and R1. FIG. 15 shows an example of replicating IOAM information in a forward packet to an HBH OAM TLV of a return packet, and includes but is not limited to the following processes.

1501: A first network device Sender obtains a STAMP packet, inserts an HBH OAM TLV related to to-be-measured performance into an option TLV part of the STAMP packet, and encapsulates an IOAM header for the STAMP packet.

The first network device side has an access control list (ACL) configured based on source and destination IP addresses of the STAMP, and the ACL is an ordered rule set formed by a series of permit or deny statements. This ACL is used to create an IOAM instance, indicating an intermediate device to collect measurement information about a data flow that matches performance.

1502: A network device serving as a measurement device on a forward path collects, on a data plane based on the IOAM header, related performance data, that is, first measurement information obtained by measuring network performance, and records the first measurement information in an HBH header. Then, the measurement device sends the STAMP packet carrying the first measurement information to a next-hop node on the forward path until the STAMP packet is sent to an egress node, that is, the reflector.

1503: After receiving the STAMP packet sent by the sender, the reflector copies IOAM data to the OAM TLV.

1504: The reflector copies the OAM TLV part in the original STAMP packet to a second (reply) packet, as shown by arrows in FIG. 15, and sends the second packet to the sender. The second packet may be an Active Measurement Protocol packet.

1505: On the return trip, because the second packet is an Active Measurement Protocol packet, a measurement device on a reverse path of the return trip may still collect IOAM data, that is, collect second measurement information obtained by the measurement device by measuring network performance. Finally, complete measurement information includes both IOAM data in the HBH header and performance data carried in the OAM TLV.

Figure 16:
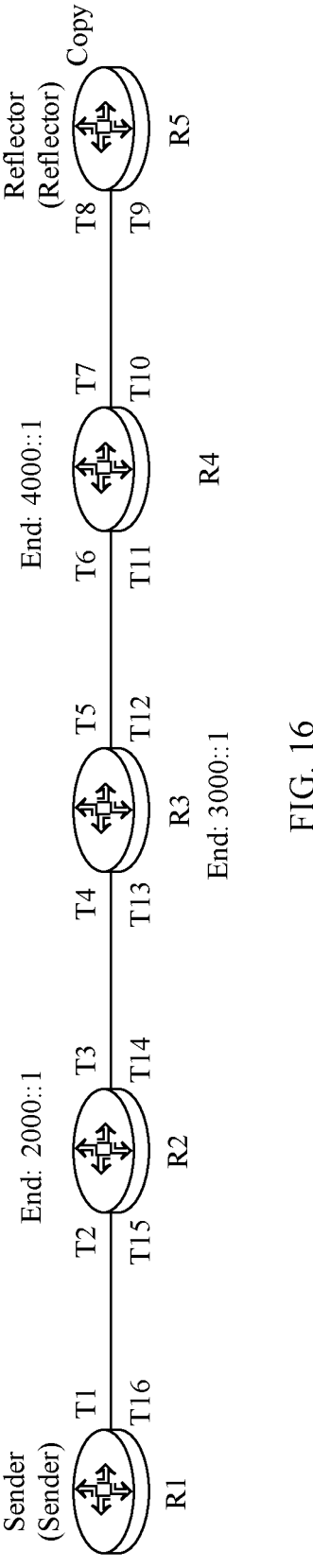
FIG. 16 is a schematic diagram of interaction of a network performance measurement method according to an embodiment of this application.

An example in which delay information of each link on a candidate path, in two directions: R1 to R5 and R5 to R1, of an SR Policy is collected by using an IOAM header in a scenario in which delay information is collected hop by hop on an SR path shown in FIG. 16 is used to describe the network performance measurement method provided in embodiments of this application. The method includes but is not limited to the following processes.

1601: A first network device, that is, a sending node (Sender) R1, obtains a STAMP packet, where path information <2000::1, 3000::1, 4000::1> of a forward path is encapsulated in an SRH of the STAMP packet.

Optionally, an extended TLV part in the STAMP packet carries a Path TLV, and the Path TLV is used to record reverse path information, that is, identifiers <4000::1, 3000::1, 2000::1> of nodes on the reverse path. In addition, an ACL is configured based on source and destination IP addresses of the STAMP packet, so that a corresponding IOAM header is encapsulated into the corresponding STAMP packet, and the IOAM header is used to indicate an intermediate device to measure network performance, thereby collecting measurement information.

1602: The sender sends the STAMP packet to an egress node reflector, where the STAMP packet sent to the reflector passes through node devices R2, R3, and R4 in sequence. Because the intermediate devices R2, R3, and R4 support an IOAM measurement capability, and a segment list includes identifiers of nodes corresponding to R2, R3, and R4, forwarding planes of the node devices R2, R3, and R4 sequentially encapsulate timestamp information T2 to T7 into an HBH header.

1603: After receiving the STAMP packet, the reflector obtains a second packet, that is, a reply packet, copies the timestamp information in the HBH header of the STAMP packet to an HBH OAM TLV of the reply packet, and sends the reply packet to the sender.

1604: Process the reply packet in the same processing manner as the STAMP packet sent by the sender, to obtain timestamp information T10 to T15, and use an HBH header to carry the timestamp information.

1605: The sender receives the reply packet, records a receiving time T16, extracts the timestamp information T2 to T7 from the OAM TLV of the reply packet, extracts the timestamp information T10 to T15 from the HBH header, and calculates a transmission delay of each link based on original performance data information in the STAMP packet.

According to the method provided in the embodiment shown in FIG. 16, a network device on a measurement path uses an IOAM measurement manner, a forwarding plane of the network device collects measurement information, and the measurement information does not need to be sent to a control plane for processing. Therefore, the method provided in the embodiment shown in FIG. 16 improves measurement efficiency compared with the method provided in the embodiment shown in FIG. 14. However, the method provided in the embodiment shown in FIG. 16 requires the measurement device to enable IOAM measurement, that is, to have an IOAM measurement capability.

The foregoing describes the network performance measurement method in embodiments of this application. Corresponding to the foregoing method, embodiments of this application further provide a network performance measurement apparatus.

Figure 17:
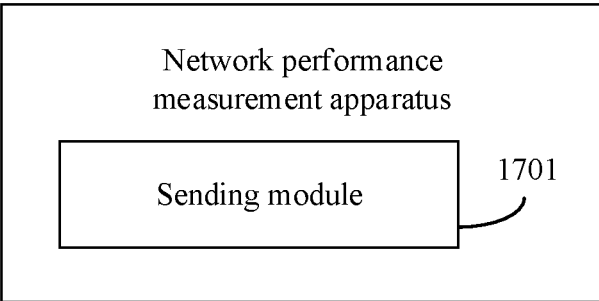
FIG. 17 is a schematic diagram of a structure of a network performance measurement apparatus according to an embodiment of this application.

FIG. 17 is a schematic diagram of a structure of a network performance measurement apparatus according to an embodiment of this application. The apparatus is applied to a first network device, and the first network device is the first network device shown in any one of FIG. 2 and FIG. 9 to FIG. 16. Based on the following modules shown in FIG. 17, the network performance measurement apparatus shown in FIG. 17 can perform all or some operations performed by the first network device. It should be understood that the apparatus may include more additional modules than the shown modules or omit some of the shown modules. This is not limited in this embodiment of this application. As shown in FIG. 17, the apparatus includes: a sending module 1701, configured to send a first Active Measurement Protocol packet to a second network device, where the first Active Measurement Protocol packet includes measurement indication information, the measurement indication information is used to indicate a measurement device on a forward path to measure network performance, the measurement device on the forward path includes at least one intermediate device on the forward path, the first network device is an ingress node on the forward path, and the second network device is an egress node on the forward path.

In a possible implementation, the first Active Measurement Protocol packet includes a segment list, the segment list is used to indicate the forward path, and the measurement indication information is included in a segment identifier corresponding to the measurement device on the forward path in the segment list.

In a possible implementation, the first Active Measurement Protocol packet includes an in-situ operation, administration and maintenance IOAM header, the measurement indication information is included in the IOAM header, and the measurement device on the forward path includes an intermediate device having an IOAM measurement capability on the forward path.

In a possible implementation, the measurement indication information includes first indication information and second indication information, the first Active Measurement Protocol packet includes an IOAM header and a segment list, the first indication information is included in the IOAM header, the segment list is used to indicate the forward path, and the second indication information is included in a segment identifier corresponding to the measurement device on the forward path in the segment list.

In a possible implementation, the apparatus further includes: a receiving module, configured to receive a second packet sent by the second network device, where the second packet includes first measurement information obtained by the measurement device on the forward path by measuring network performance based on the measurement indication information.

In a possible implementation, the first Active Measurement Protocol packet further includes an identifier of a measurement device on a reverse path, the measurement device on the reverse path includes at least one intermediate device on the reverse path, an ingress node on the reverse path is the second network device, and an egress node on the reverse path is the first network device. The second packet is an Active Measurement Protocol packet for the reverse path, the second packet further includes reverse indication information, and the reverse indication information is used to indicate the measurement device on the reverse path to measure network performance.

In a possible implementation, the measurement device on the reverse path is the same as the measurement device on the forward path, or the measurement device on the reverse path is different from the measurement device on the forward path.

In a possible implementation, the first measurement information is included in a TLV field of the second packet.

In a possible implementation, the sending module 1701 is further configured to send the first measurement information to a control device.

In a possible implementation, the first Active Measurement Protocol packet further includes a measurement type identifier, and the measurement type identifier is used to indicate a type of network performance measured by the measurement device on the forward path.

In a possible implementation, types of network performance include one or more of the following: delay information, jitter information, path information, packet loss information, and bandwidth information.

In a possible implementation, the first Active Measurement Protocol packet includes a STAMP packet, a OWAMP packet, or a TWAMP packet.

Figure 18:
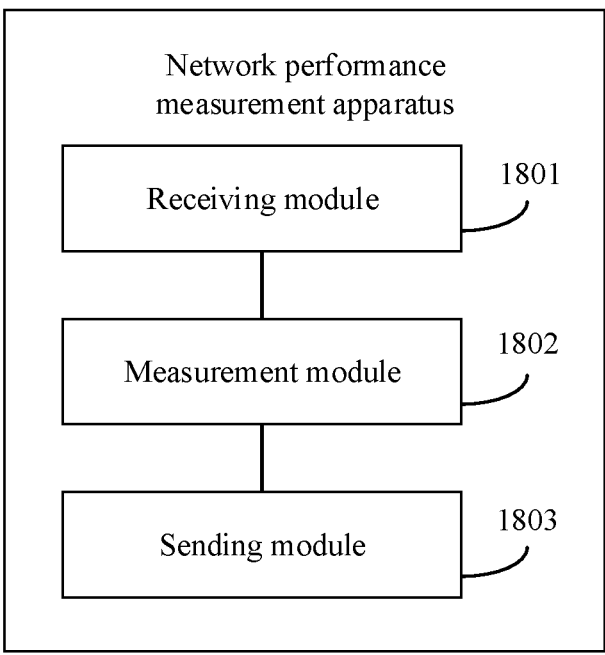
FIG. 18 is a schematic diagram of a structure of a network performance measurement apparatus according to an embodiment of this application.

FIG. 18 is a schematic diagram of a structure of a network performance measurement apparatus according to an embodiment of this application. The apparatus is applied to a third network device, and the third network device is the third network device shown in any one of FIG. 6 and FIG. 9 to FIG. 16. Based on the following modules shown in FIG.

18, the network performance measurement apparatus shown in FIG. 18 can perform all or some operations performed by the third network device. It should be understood that the apparatus may include more additional modules than the shown modules or omit some of the shown modules. This is not limited in this embodiment of this application. As shown in FIG. 18, the apparatus includes: a receiving module 1801, configured to receive a first Active Measurement Protocol packet sent by a first network device to a second network device, where the first Active Measurement Protocol packet includes measurement indication information, the measurement indication information is used to indicate a measurement device on a forward path to measure network performance, the measurement device on the forward path includes at least one intermediate device on the forward path, the measurement device on the forward path includes the third network device, the first network device is an ingress node on the forward path, and the second network device is an egress node on the forward path; a measurement module 1802, configured to measure network performance based on the measurement indication information, to obtain first measurement information; and a sending module 1803, configured to send the first measurement information.

In a possible implementation, the first Active Measurement Protocol packet includes a segment list, the segment list is used to indicate a forward path, and the measurement indication information is included in a segment identifier corresponding to the measurement device on the forward path in the segment list. The measurement module 1802 is further configured to determine that a destination address field of the first Active Measurement Protocol packet includes a local segment identifier, and the local segment identifier includes the measurement indication information.

In a possible implementation, the first Active Measurement Protocol packet includes an in-situ operation, administration and maintenance IOAM header, and the measurement indication information is included in the IOAM header. The measurement module 1802 is further configured to obtain the measurement indication information from the IOAM header. The third network device is a device having an IOAM measurement capability.

In a possible implementation, the measurement indication information includes first indication information and second indication information, the first Active Measurement Protocol packet includes an IOAM header and a segment list, the first indication information is included in the IOAM header, the segment list is used to indicate the forward path, and the second indication information is included in a segment identifier corresponding to the measurement device on the forward path in the segment list. The measurement module 1802 is further configured to obtain the first indication information from the IOAM header, and obtain the second indication information from a segment identifier corresponding to the third network device.

In a possible implementation, the sending module 1803 is configured to: use the first Active Measurement Protocol packet to carry the first measurement information, and send the first Active Measurement Protocol packet that carries the first measurement information to the second network device.

In a possible implementation, the first measurement information is carried in an IOAM header or a TLV field of the first Active Measurement Protocol packet.

In a possible implementation, the sending module 1803 is configured to send the first measurement information to a control device.

In a possible implementation, the receiving module 1801 is further configured to receive a second Active Measurement Protocol packet sent by the second network device to the first network device. The second Active Measurement Protocol packet includes reverse indication information, the reverse indication information is used to indicate a measurement device on a reverse path to measure network performance, the measurement device on the reverse path includes at least one intermediate device on the reverse path, an ingress node on the reverse path is the second network device, an egress node on the reverse path is the first network device, and the measurement device on the reverse path includes the third network device. The measurement module 1802 is further configured to measure network performance based on the reverse indication information, to obtain second measurement information. The sending module 1803 is further configured to send the second measurement information.

In a possible implementation, the second Active Measurement Protocol packet includes the first measurement information.

In a possible implementation, the first Active Measurement Protocol packet includes a measurement type identifier, and the measurement type identifier is used to indicate a type of network performance measured by the measurement device on the forward path. The measurement module 1802 is configured to measure, based on the measurement indication information, the type of network performance indicated by the measurement type identifier, to obtain the first measurement information.

In a possible implementation, types of network performance include one or more of the following: delay information, jitter information, path information, packet loss information, and bandwidth information.

Figure 19:
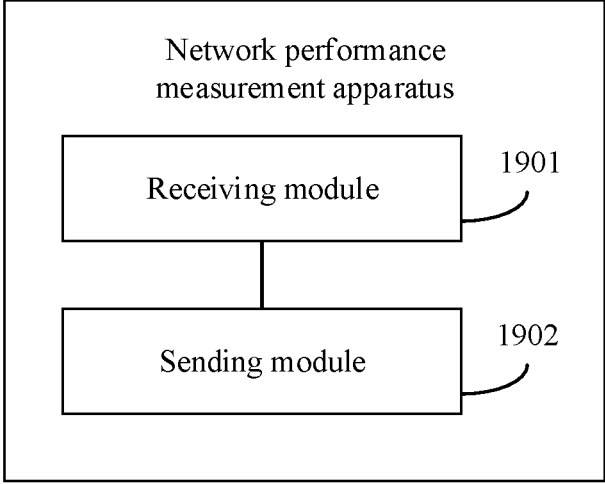
FIG. 19 is a schematic diagram of a structure of a network performance measurement apparatus according to an embodiment of this application.

FIG. 19 is a schematic diagram of a structure of a network performance measurement apparatus according to an embodiment of this application. The apparatus is applied to a second network device, and the second network device is the second network device shown in any one of FIG. 7 and FIG. 9 to FIG. 16. Based on the following modules shown in FIG. 19, the network performance measurement apparatus shown in FIG. 19 can perform all or some operations performed by the second network device. It should be understood that the apparatus may include more additional modules than the shown modules or omit some of the shown modules. This is not limited in this embodiment of this application. As shown in FIG. 19, the apparatus includes: a receiving module 1901, configured to receive a first Active Measurement Protocol packet sent by a first network device, where the first Active Measurement Protocol packet includes measurement indication information, the measurement indication information is used to indicate a measurement device on a forward path to measure network performance, the measurement device on the forward path includes at least one intermediate device on the forward path, the first Active Measurement Protocol packet further includes first measurement information obtained by the measurement device on the forward path by measuring network performance based on the measurement indication information, the first network device is an ingress node on the forward path, and the second network device is an egress node on the forward path; and a sending module 1902, configured to send the first measurement information.

In a possible implementation, the sending module 1902 is configured to send a second packet to the first network device, where the second packet includes the first measurement information.

In a possible implementation, the first Active Measurement Protocol packet further includes an identifier of a measurement device on a reverse path, the measurement device on the reverse path includes at least one intermediate device on the reverse path, an ingress node on the reverse path is the second network device, and an egress node on the reverse path is the first network device. The second packet is an Active Measurement Protocol packet, the second packet further includes reverse indication information, and the reverse indication information is used to indicate the measurement device on the reverse path to measure network performance.

In a possible implementation, the first measurement information is included in a TLV field of the second packet.

In a possible implementation, the sending module 1902 is configured to send the first measurement information to a control device.

In a possible implementation, the second Active Measurement Protocol packet further includes third measurement information obtained by the second network device by measuring network performance based on the measurement indication information. The sending module 1902 is configured to send the third measurement information.

In a possible implementation, the first measurement information is included in a TLV field of the first Active Measurement Protocol packet, or the first measurement information is included in an in-situ operation, administration and maintenance IOAM header of the first Active Measurement Protocol packet.

It should be understood that, when the apparatuses provided in FIG. 17 to FIG. 19 implement functions of the apparatuses, division into the foregoing functional modules is merely used as an example for description. In actual application, the foregoing functions may be allocated to different functional modules for implementation based on a requirement. In other words, a device is divided into different functional modules in terms of an inner structure, to implement all or some of the functions described above. In addition, the apparatuses provided in the foregoing embodiments and the method embodiments pertain to a same concept. For an implementation process of the apparatuses, refer to the method embodiments. Details are not described herein again.

Figure 20:
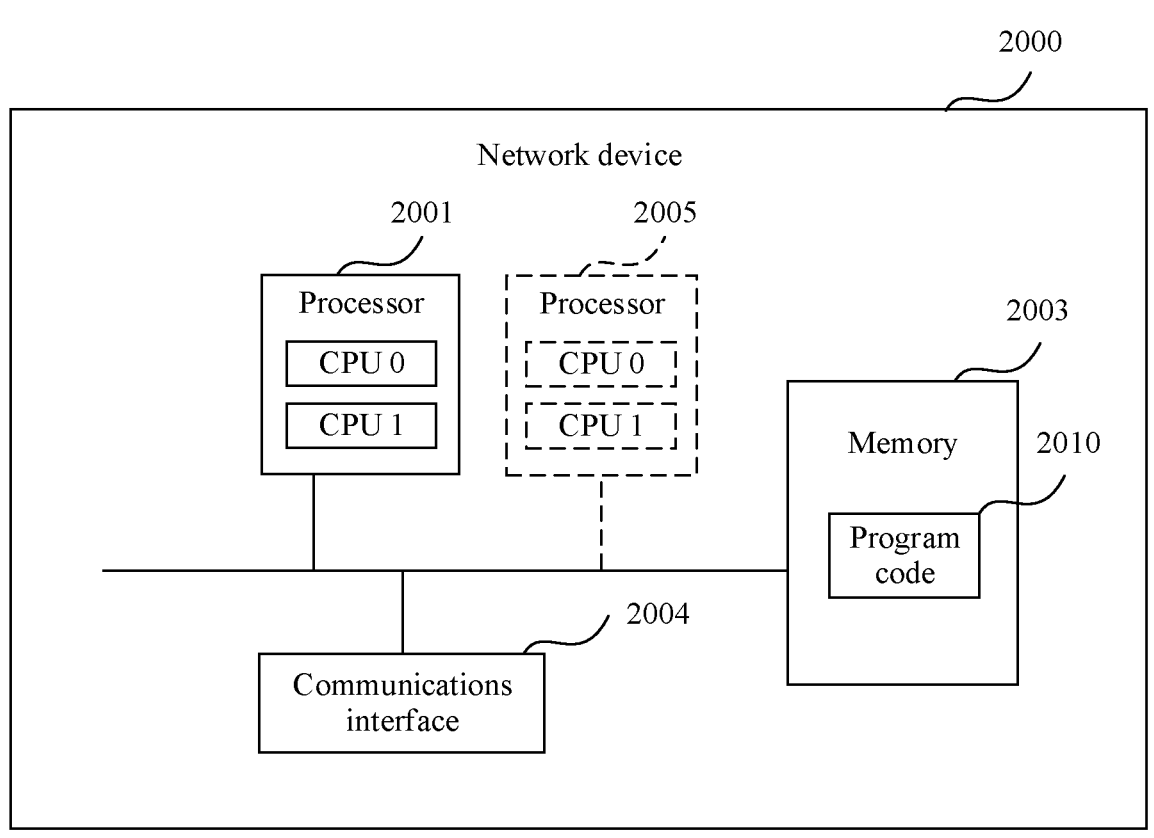
FIG. 20 is a schematic diagram of a structure of a network performance measurement device according to an embodiment of this application.

FIG. 20 is a schematic diagram of a structure of a network device 2000 according to an example embodiment of this application. The network device 2000 shown in FIG. 20 is configured to perform operations related to the network performance measurement methods shown in FIG. 2, FIG. 6, FIG. 7, and FIG. 9 to FIG. 16. The network device 2000 is, for example, a switch or a router, and the network device 2000 may be implemented by using a general bus architecture.

As shown in FIG. 20, the network device 2000 includes at least one processor 2001, a memory 2003, and at least one communications interface 2004.

The processor 2001 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), a generic array logic (GAL), or any combination thereof. The processor may implement or execute various logical blocks, modules, and circuits described with reference to content disclosed in the embodiments of the present disclosure. Alternatively, the processor may be a combination of processors implementing a computing function, for example, a combination of one or more microprocessors, or a combination of a DSP and a microprocessor.

Optionally, the network device 2000 further includes a bus. The bus is configured to transmit information between components of the network device 2000. The bus may be a peripheral component interconnect (PCI) bus, an Extended Industry Standard Architecture (EISA) bus, or the like. Buses may be classified into an address bus, a data bus, a control bus, and the like. For ease of expression, the bus is indicated by only a bold line in FIG. 20, which does not mean that only one bus or one type of bus exists.

The memory 2003 is, for example, a ROM or another type of static storage device that can store static information and an instruction, or a random-access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc (DVD), a BLU-RAY disc, and the like), a magnetic disk storage medium or another magnetic storage device, or any other medium that can be used to carry or store expected program code in a form of instructions or a data structure and that can be accessed by a computer, but is not limited thereto. For example, the memory 2003 exists independently, and is connected to the processor 2001 by using the bus. Alternatively, the memory 2003 may be integrated with the processor 2001.

The communications interface 2004 is any apparatus such as a transceiver, to communicate with another device or a communications network. The communications network may be the Ethernet, a radio access network (RAN), a wireless local area network (WLAN), or the like. The communications interface 2004 may include a wired communications interface, and may alternatively include a wireless communications interface. Specifically, the communications interface 2004 may be an Ethernet interface, a Fast Ethernet (FE) interface, a Gigabit Ethernet (GE) interface, an Asynchronous Transfer Mode (ATM) interface, a WLAN interface, a cellular network communications interface, or a combination thereof. The Ethernet interface may be an optical interface, an electrical interface, or a combination thereof. In this embodiment of this application, the communications interface 2004 may be used by the network device 2000 to communicate with another device.

In an implementation, in an embodiment, the processor 2001 may include one or more CPUs, for example, a CPU 0 and a CPU 1 shown in FIG. 20. Each of the processors may be a single-core (single-CPU) processor, or may be a multi-core (multi-CPU) processor. The processor herein may be one or more devices, circuits, and/or processing cores configured to process data (for example, computer program instructions).

During an implementation, in an embodiment, the network device 2000 may include a plurality of processors, for example, a processor 2001 and a processor 2005 shown in FIG. 20. Each of the processors may be a single-core (single-CPU) processor or may be a multi-core (multi-CPU) processor. The processor herein may be one or more devices, circuits, and/or processing cores configured to process data (for example, computer program instructions).

In an implementation, in an embodiment, the network device 2000 may further include an output device and an input device. The output device communicates with the processor 2001, and may display information in a plurality of manners. For example, the output device may be a liquid-crystal display (LCD), a light-emitting diode (LED) display device, a cathode-ray tube (CRT) display device, a projector, or the like. The input device communicates with the processor 2001, and may receive an input of a user in a plurality of manners. For example, the input device may be a mouse, a keyboard, a touchscreen device, or a sensor device.

In some embodiments, the memory 2003 is configured to store program code 2010 for executing the solutions of this application, and the processor 2001 may execute the program code 2010 stored in the memory 2003. In other words, the network device 2000 may implement, by using the processor 2001 and the program code 2010 in the memory 2003, the network performance measurement method provided in the method embodiment. The program code 2010 may include one or more software modules. Optionally, the processor 2001 may also store program code or an instruction for executing the solutions of this application.

In an embodiment, the network device 2000 in this embodiment of this application may be corresponding to the first network device in the foregoing method embodiments. The processor 2001 in the network device 2000 reads the instruction in the memory 2003, so that the network device 2000 shown in FIG. 20 can perform all or some operations performed by the first network device.

Specifically, the processor 2001 is configured to send a first Active Measurement Protocol packet to a second network device through the communications interface. The first Active Measurement Protocol packet includes measurement indication information, the measurement indication information is used to indicate a measurement device on a forward path to measure network performance, the forward path is a forwarding path of the first Active Measurement Protocol packet, the first network device and the second network device are two ends of the forward path, and the measurement device on the forward path includes at least one intermediate device on the forward path.

For brevity, other optional implementations are not described herein again.

For another example, the network device 2000 in this embodiment of this application may be corresponding to the third network device in the foregoing method embodiments. The processor 2001 in the network device 2000 reads the instruction in the memory 2003, so that the network device 2000 shown in FIG. 20 can perform all or some operations performed by the third network device.

Specifically, the processor 2001 is configured to receive, through the communications interface, a first Active Measurement Protocol packet sent by a first network device to a second network device, where the first Active Measurement Protocol packet includes measurement indication information, the measurement indication information is used to indicate a measurement device on a forward path to measure network performance, the forward path is a forwarding path of the first Active Measurement Protocol packet, the first network device and the second network device are two ends of the forward path, the measurement device on the forward path includes at least one intermediate device on the forward path, and the measurement device on the forward path includes the third network device; measure network performance based on the measurement indication information, to obtain first measurement information; and send the first measurement information through the communications interface.

For brevity, other optional implementations are not described herein again.

For another example, the network device 2000 in this embodiment of this application may be corresponding to the second network device in the foregoing method embodiments. The processor 2001 in the network device 2000 reads the instruction in the memory 2003, so that the network device 2000 shown in FIG. 20 can perform all or some operations performed by the second network device.

Specifically, the processor 2001 is configured to: receive, through the communications interface, a first Active Measurement Protocol packet sent by a first network device, where the first Active Measurement Protocol packet includes measurement indication information, the measurement indication information is used to indicate a measurement device on a forward path to measure network performance, the forward path is a forwarding path of the first Active Measurement Protocol packet, the first network device and the second network device are two ends of the forward path, the measurement device on the forward path includes at least one intermediate device on the forward path, and the first Active Measurement Protocol packet further includes first measurement information obtained by the measurement device on the forward path by measuring network performance based on the measurement indication information; and send the first measurement information through the communications interface.

For brevity, other optional implementations are not described herein again.

The network device 2000 may be further corresponding to the network device measurement apparatus shown in FIG. 17 to FIG. 19. Each function module in the network device measurement apparatus is implemented by using software of the network device 2000. In other words, the function modules included in the network device measurement apparatus are generated after the processor 2001 of the network device 2000 reads the program code 2010 stored in the memory 2003.

The steps of the network performance measurement methods shown in FIG. 2, FIG. 6, FIG. 7, and FIG. 9 to FIG. 16 are completed by using an integrated logic circuit of hardware in the processor of the network device 2000, or by using instructions in a form of software. The steps of the method disclosed with reference to embodiments of this application may be directly performed by a hardware processor, or may be performed by using a combination of hardware in the processor and a software module. A software module may be located in a mature storage medium in the art, such as a RAM, a flash memory, a ROM, a PROM, an EEPROM, or a register. The storage medium is located in the memory, and the processor reads information in the memory and completes the steps in the foregoing methods in combination with the hardware in the processor. To avoid repetition, details are not described herein again.

Figure 21:
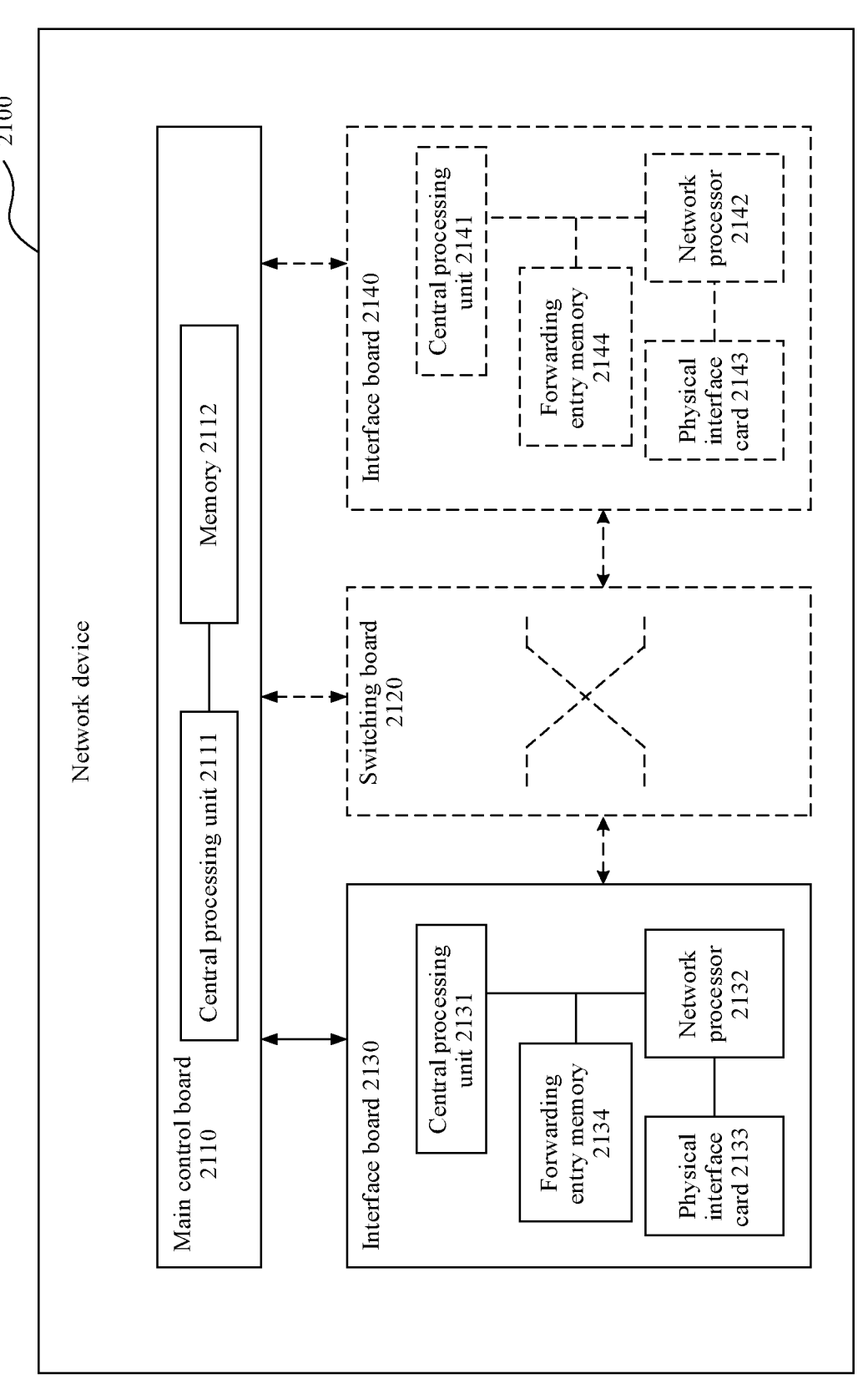
FIG. 21 is a schematic diagram of a structure of a network performance measurement device according to an embodiment of this application.

FIG. 21 is a schematic diagram of a structure of a network device 2100 according to another example embodiment of this application. The network device 2100 shown in FIG. 21 is configured to perform all or some operations related to the network performance measurement methods shown in FIG. 2, FIG. 6, FIG. 7, and FIG. 9 to FIG. 16. The network device 2100 is, for example, a switch or a router, and the network device 2100 may be implemented by using a general bus architecture.

As shown in FIG. 21, the network device 2100 includes a main control board 2110 and an interface board 2130.

The main control board is also referred to as a main processing unit (MPU) or a route processor card. The main control board 2110 is configured to control and manage components in the network device 2100, including route computation, device management, device maintenance, and protocol-based processing. The main control board 2110 includes a central processing unit 2111 and a memory 2112.

The interface board 2130 is also referred to as a line processing unit (LPU), a line card, or a service board. The interface board 2130 is configured to: provide various service interfaces, and forward a data packet. The service interface includes but is not limited to an Ethernet interface, a Packet over SONET/SDH (POS) interface, and the like. The Ethernet interface is, for example, a flexible Ethernet service interface (FlexE Clients). The interface board 2130 includes a central processing unit 2131, a network processor 2132, a forwarding entry memory 2134, and a physical interface card (PIC) 2133.

The central processing unit 2131 on the interface board 2130 is configured to control and manage the interface board 2130 and communicate with the central processing unit 2111 on the main control board 2110.

The network processor 2132 is configured to implement packet forwarding processing. A form of the network processor 2132 may be a forwarding chip. The forwarding chip may be a NP. In some embodiments, the forwarding chip may be implemented by using ASIC or a FPGA. Specifically, the network processor 2132 is configured to forward a received packet based on a forwarding table stored in the forwarding entry memory 2134. If a destination address of the packet is an address of the network device 2100, the network processor 2132 sends the packet to a CPU (for example, the central processing unit 2131) for processing. If a destination address of the packet is not an address of the network device 2100, the network processor 2132 searches for, based on the destination address, a next hop and an outbound interface corresponding to the destination address in the forwarding table, and forwards the packet to the outbound interface corresponding to the destination address. Processing on an uplink packet may include processing at a packet ingress interface and forwarding table lookup, and processing on a downlink packet may include forwarding table lookup and the like. In some embodiments, the central processing unit may also perform a function of the forwarding chip, for example, implement software forwarding based on a general-purpose CPU, so that the interface board does not need the forwarding chip.

The physical interface card 2133 is configured to implement a physical layer interconnection function. Original traffic enters the interface board 2130 from the physical interface card 2133, and a processed packet is sent out from the physical interface card 2133. The physical interface card 2133 is also referred to as a subcard and may be installed on the interface board 2130, and is responsible for converting an optoelectronic signal into a packet, performing validity check on the packet, and then forwarding the packet to the network processor 2132 for processing. In some embodiments, the central processing unit 2131 may alternatively perform a function of the network processor 2132, for example, implement software forwarding based on a general CPU. Therefore, the network processor 2132 is not necessary in the physical interface card 2133.

Optionally, the network device 2100 includes a plurality of interface boards. For example, the network device 2100 further includes an interface board 2140, and the interface board 2140 includes a central processing unit 2141, a network processor 2142, a forwarding entry memory 2144, and a physical interface card 2143. Functions and implementations of components in the interface board 2140 are the same as or similar to those of the interface board 2130, and details are not described herein again.

Optionally, the network device 2100 further includes a switching board 2120. The switching board 2120 may also be referred to as a switch fabric unit (switch fabric unit, SFU). When the network device has a plurality of interface boards, the switching board 2120 is configured to complete data exchange between the interface boards. For example, the interface board 2130 and the interface board 2140 may communicate with each other via the switching board 2120.

The main control board 2110 is coupled to the interface board. For example, the main control board 2110, the interface board 2130, the interface board 2140, and the switching board 2120 are connected to a system backboard by using a system bus for interworking. In a possible implementation, an inter-process communication (inter-process communication, IPC) channel is established between the main control board 2110 and the interface board 2130 and between the main control board 2110 and the interface board 2140, and communication between the main control board 2110 and the interface board 2130 and between the main control board 2110 and the interface board 2140 is performed by using the IPC channel.

Logically, the network device 2100 includes a control plane and a forwarding plane. The control plane includes the main control board 2110 and the central processing unit 2111. The forwarding plane includes components used for forwarding, for example, the forwarding entry memory 2134, the physical interface card 2133, and the network processor 2132. The control plane performs the following functions: a router, generating a forwarding table, processing signaling and a protocol packet, configuring and maintaining a network device status, and the like. The control plane delivers the generated forwarding table to the forwarding plane. On the forwarding plane, the network processor 2132 searches the forwarding table delivered by the control plane, and then forwards, based on the table, a packet received by the physical interface card 2133. The forwarding table delivered by the control plane may be stored in the forwarding entry memory 2134. In some embodiments, the control plane and the forwarding plane may be totally separated, and are not on a same network device.

It should be noted that, there may be one or more main control boards. When there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a network device in the centralized architecture. Optionally, the network device may alternatively be in a form in which there is only one card. In an example, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of network device (for example, a network device such as a low-end switch or a router) has a weak data exchange and processing capability. An architecture that is to be used depends on a \ networking deployment scenario. This is not limited herein.

In an embodiment, the network device 2100 is corresponding to the network performance measurement apparatus that is applied to the first network device and that is shown in FIG. 17. In some embodiments, the sending module 1601 in the network performance measurement apparatus shown in FIG. 17 is equivalent to the physical interface card 2133 in the network device 2100.

In some embodiments, the network device 2100 is corresponding to the network performance measurement apparatus that is applied to the third network device and that is shown in FIG. 18. In some embodiments, the receiving module 1701 and the sending module 1803 in the network performance measurement apparatus shown in FIG. 18 are equivalent to the physical interface card 2133 in the network device 2100, and the measurement module 1702 is equivalent to the central processing unit 2111 or the network processor 2132 in the network device 2100.

In some embodiments, the network device 2100 is corresponding to the network performance measurement apparatus that is applied to the second network device and that is shown in FIG. 19. In some embodiments, the receiving module 1901 and the sending module 1902 in the network performance measurement apparatus shown in FIG. 19 are equivalent to the physical interface card 2133 in the network device 2100.

Based on the network devices shown in FIG. 20 and FIG. 21, an embodiment of this application further provides a network performance measurement system. The measurement system includes a first network device, a second network device, and a third network device. Optionally, the first network device is the network device 2000 shown in FIG. 20 or the network device 2100 shown in FIG. 21, the second network device is the network device 2000 shown in FIG. 20 or the network device 2100 shown in FIG. 21, and the third network device is the network device 2000 shown in FIG. 20 or the network device 2100 shown in FIG. 21.

For the network performance measurement methods performed by the first network device, the second network device, and the third network device, refer to related descriptions in the embodiments shown in FIG. 2, FIG. 6, FIG. 7, and FIG. 9 to FIG. 16. Details are not described herein again.

An embodiment of this application further provides a communications apparatus. The apparatus includes a transceiver, a memory, and a processor. The transceiver, the memory, and the processor communicate with each other by using an internal connection channel. The memory is configured to store instructions. The processor is configured to execute the instructions stored in the memory, to control the transceiver to receive a signal and control the transceiver to send a signal. When the processor executes the instructions stored in the memory, the processor is enabled to perform the method that needs to be performed by the first network device.

An embodiment of this application further provides a communications apparatus. The apparatus includes a transceiver, a memory, and a processor. The transceiver, the memory, and the processor communicate with each other by using an internal connection channel. The memory is configured to store instructions. The processor is configured to execute the instructions stored in the memory, to control the transceiver to receive a signal and control the transceiver to send a signal. When the processor executes the instructions stored in the memory, the processor is enabled to perform the method that needs to be performed by the third network device.

An embodiment of this application further provides a communications apparatus. The apparatus includes a transceiver, a memory, and a processor. The transceiver, the memory, and the processor communicate with each other by using an internal connection channel. The memory is configured to store instructions. The processor is configured to execute the instructions stored in the memory, to control the transceiver to receive a signal and control the transceiver to send a signal. When the processor executes the instructions stored in the memory, the processor is enabled to perform the method that needs to be performed by the second network device.

It should be understood that the processor may be a CPU, or may be another general-purpose processor, a DSP, an ASIC, a FPGA or another programmable logic device, a discrete gate or a transistor logic device, a discrete hardware component, or the like. The general-purpose processor may be a microprocessor or any conventional processor or the like. It should be noted that the processor may be a processor that supports an advanced reduced instruction set computing machines (ARM) architecture.

Further, in an optional embodiment, the memory may include a read-only memory and a RAM, and provide instructions and data for the processor. The memory may further include a non-volatile RAM (NVRAM). For example, the memory may further store information about a device type.

The memory may be a volatile memory or a nonvolatile memory, or may include both a volatile memory and a nonvolatile memory. The nonvolatile memory may be a ROM, a programmable ROM (PROM), an erasable PROM (EPROM), an EEPROM, or a flash memory. The volatile memory may be a RAM, used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

An embodiment of this application further provides a computer-readable storage medium. The storage medium stores at least one instruction, and the instruction is loaded and executed by a processor to implement any one of the foregoing network performance measurement methods.

An embodiment of this application further provides a computer program product with a computer program. When the computer program is executed by a computer, a processor or the computer may be enabled to perform corresponding steps and/or procedures in the foregoing method embodiments.

An embodiment of this application further provides a chip, including a processor, configured to invoke, from a memory, instructions stored in the memory and run the instructions, to enable a communications device on which the chip is installed to perform the methods in the foregoing aspects.

An embodiment of this application further provides another chip, including an input interface, an output interface, a processor, and a memory. The input interface, the output interface, the processor, and the memory are connected by using an internal connection channel. The processor is configured to execute code in the memory. When the code is executed, the processor is configured to perform the methods in the foregoing aspects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, a Solid State Disk (SSD)).

A person of ordinary skill in the art may be aware that, in combination with the embodiments disclosed in this specification, method steps and modules may be implemented by software, hardware, firmware, or any combination thereof. To clearly describe the interchangeability between the hardware and the software, the foregoing has generally described steps and composition of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

A person of ordinary skill in the art may understand that all or some of the steps of embodiments may be implemented by hardware or a program instructing related hardware. The program may be stored in a computer-readable storage medium. The storage medium may include: a ROM, a magnetic disk, or an optical disc.

When software is used to implement the embodiments, the embodiments may be implemented completely or partially in a form of a computer program product. The computer program product includes one or more computer program instructions. For example, the method in embodiments of this application may be described in a context of a machine-executable instruction. The machine-executable instruction is, for example, a program module executed in a device included in a real or virtual processor of a target. Generally, a program module includes a routine, a program, a library, an object, a class, a component, a data structure, and the like, and executes a specific task or implements a specific abstract data structure. In various embodiments, functions of program modules may be combined or split between the described program modules. A machine-executable instruction for a program module may be executed locally or within a distributed device. In a distributed device, program modules may be located both locally and in a remote storage medium.

Computer program code used to implement the method in the embodiments of this application may be written in one or more programming languages. The computer program code may be provided for a processor of a general-purpose computer, a dedicated computer, or another programmable data processing apparatus, so that when the program code is executed by the computer or another programmable data processing apparatus, functions/operations specified in the flowcharts and/or block diagrams are implemented. The program code may be executed completely on a computer, partially on a computer, as an independent software package, partially on a computer and partially on a remote computer, or completely on a remote computer or server.

In a context of the embodiments of this application, the computer program code or related data may be carried by any appropriate carrier, so that a device, an apparatus, or a processor can perform various processing and operations described above. Examples of the carrier include a signal, a computer-readable medium, and the like.

Examples of the signal may include propagating signals in electrical, optical, radio, sound, or other forms, such as carrier waves and infrared signals.

The machine-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any suitable combination thereof. More detailed examples of the machine-readable storage medium include an electrical connection with one or more wires, a portable computer disk, a hard disk, a RAM, a ROM, an EPROM or flash memory, an optical storage device, a magnetic storage device, or any suitable combination thereof.

It may be clearly understood by a person skilled in the art that, for the purpose of convenient and brief description, for a detailed working process of the foregoing system, device, and module, refer to a corresponding process in the foregoing method embodiment, and details are not described herein.

In the several embodiments provided in this application, it should be understood that the disclosed system, device, and method may be implemented in other manners. For example, the described device embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces.

Indirect couplings or communication connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected according to actual requirements to achieve the objectives of the solutions in the embodiments of this application.

In addition, functional modules in the embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software function module and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for indicating a computer device (which may be a personal computer, a server, or a network device) to perform all or some of the steps of the method described in the embodiments of this application. The foregoing storage medium includes: any medium that can store program code, such as a Universal Serial Bus (USB) flash drive, a removable hard disk, a ROM, a RAM, a magnetic disk, or a compact disc.

In this application, terms such as "first" and "second" are used to distinguish between same items or similar items that have basically same functions. It should be understood that there is no logical or time sequence dependency between "first", "second", and "n$^{th}$", and a quantity and an execution sequence are not limited. It should also be understood that although terms such as "first" and "second" are used in the following description to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

It should further be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

In this application, the term "at least one" means one or more, and the term "a plurality of" means two or more. For example, a plurality of second packets mean two or more second packets. The terms "system" and "network" may be used interchangeably in this specification.

It should be understood that the terms used in the descriptions of the various examples in the specification are merely intended to describe examples but are not intended to constitute a limitation. The terms "one" ("a" and "an") and "the" of singular forms used in the descriptions of the various examples and the appended claims are also intended to include plural forms, unless otherwise specified in the context clearly.

It should be understood that, the term "and/or" used in this specification indicates and includes any or all possible combinations of one or more items in associated listed items. The term "and/or" in this specification describes an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

It should further be understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that determining B based on A does not mean that B is determined based on only A, but B may alternatively be determined based on A and/or other information.

It should further be understood that "one embodiment", "an embodiment", or "a possible implementation" mentioned throughout this specification means that particular features, structures, or characteristics related to the embodiments or implementations are included in at least one embodiment of this application. Therefore, "in one embodiment", "in an embodiment", or "in a possible implementation" appearing throughout this specification does not necessarily refer to a same embodiment. In addition, these particular features, structures, or characteristics may be combined in one or more embodiments in any proper manner.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method implemented by a first network device, comprising:

sending, to a second network device, a first active measurement protocol (AMP) packet, wherein the first AMP packet comprises measurement indication information that indicates a first measurement device on a forward path, wherein the forward path is a forwarding path of the first AMP packet, wherein the first network device is a first end of the forward path, wherein the second network device is a second end of the forward path, and wherein the first measurement device is an intermediate device on the forward path; and receiving, by the first network device after sending the first AMP packet, a second packet from the second network device, wherein the second packet is a reflected test packet of the first AMP packet and comprises reverse indication information, wherein the reverse indication information indicates a second measurement device on a reverse path for measuring network performance on the reverse path, wherein the second network device is a first end of the reverse path, and wherein the first network device is a second end of the reverse path, and wherein the second measurement device is a second intermediate device on the reverse path.

2. The method of claim 1, wherein the first AMP packet comprises an In-situ Operation, Administration and Maintenance (IOAM) header, and wherein the measurement indication information is comprised in the IOAM header.

3. The method of claim 1, wherein the first AMP packet comprises a segment list, wherein the segment list indicates the forward path, and wherein the measurement indication information is comprised in a segment identifier that corresponds to the first measurement device in the segment list.

4. The method of claim 1, wherein the second packet comprises a first measurement information of the first measurement device and based on network performance of the forward path.

5. The method of claim 4, wherein the first measurement information is comprised in an In-situ Operation, Administration and Maintenance (IOAM) type-length-value (TLV) field or a forward TLV field of the second packet.

6. The method of claim 1, wherein the second packet further comprises second measurement information of the second measurement device and based on second network performance of the reverse path.

7. The method of claim 6, wherein the second measurement information is comprised in a reverse type-length-value (TLV) field of the second packet.

8. The method of claim 1, wherein the measurement indication information instructs the first measurement device to measure network performance on the forward path.

9. A network performance measurement apparatus applied to a first network device, wherein the network performance measurement apparatus comprises:

a processor; and
a transmitter coupled to the processor and configured to:
    send, to a second network device, a first active measurement protocol (AMP) packet, wherein the first AMP packet comprises measurement indication information that indicates a first measurement device on a forward path, wherein the forward path is a forwarding path of the first AMP packet, wherein the first network device is a first end of the forward path, wherein the second network device is a second end of the forward path, and wherein the first measurement device is an intermediate device on the forward path; and
    receive, after sending the first AMP packet, a second packet from the second network device, wherein the second packet is a reflected test packet of the first AMP packet and comprises reverse indication information, wherein the reverse indication information indicates a second measurement device on a reverse path for measuring network performance on the reverse path, wherein the second network device is a first end of the reverse path, and wherein the first network device is a second end of the reverse path, and wherein the second measurement device is a second intermediate device on the reverse path.

10. The network performance measurement apparatus of claim 9, wherein the first AMP packet comprises an In-situ Operation, Administration and Maintenance (IOAM) header of IOAM, wherein the measurement indication information is comprised in the IOAM header, and wherein the first measurement device comprises a first intermediate device having an IOAM measurement capability on the forward path.

11. The network performance measurement apparatus of claim 9, wherein the first AMP packet comprises a segment list, wherein the segment list indicates the forward path, and wherein the measurement indication information is comprised in a segment identifier that corresponds to the first measurement device in the segment list.

12. The network performance measurement apparatus of claim 9, wherein the second packet comprises first measurement information of the first measurement device based on network performance of the forward path.

13. The network performance measurement apparatus of claim 12, wherein the first measurement information is comprised in an In-situ Operation, Administration and Maintenance (IOAM) type length value (TLV) field or a forward TLV field of the second packet.

14. The network performance measurement apparatus of claim 9, wherein the second packet further comprises second measurement information of the second measurement device based on second network performance of the reverse path.

15. The network performance measurement apparatus of claim 14, wherein the second measurement information is comprised in a reverse type length value (TLV) field of the second packet.

16. The network performance measurement apparatus of claim 9, wherein the measurement indication information instructs the first measurement device to measure network performance on the forward path.

17. A network performance measurement system, comprising:

a first network device configured to send, to a second network device, a first active measurement protocol (AMP) packet, wherein the first AMP packet comprises measurement indication information that indicates a first measurement device on a forward path, wherein the forward path is a forwarding path of the first AMP packet, wherein the first network device is a first end of the forward path, and wherein the first measurement device is an intermediate device on the forward path;
a second network device coupled to the first network device, wherein the second network device is configured to:
    receive, from the first network device, the first AMP packet, wherein the second network device is a second end of the forward path, wherein the first AMP packet further comprises first measurement information obtained by the first measurement device on the forward path by measuring network performance of the forward path based on the measurement indication information;
    receive the first measurement information; and
    send, after receiving the first AMP packet, a second packet to the first network device, wherein the second packet is a reflected test packet of the first AMP packet and comprises reverse indication information, wherein the reverse indication information indicates a second measurement device on a reverse path for measuring network performance on the reverse path, wherein the second network device is a first end of the reverse path, and wherein the first network device is a second end of the reverse path, and wherein the second measurement device is a second intermediate device on the reverse path; and a third network device coupled to the first network device and to the second network device, wherein the third network device is a second intermediate device on the forward path, and wherein the third network device is configured to:

receive the first AMP packet, wherein the first measurement device on the forward path comprises at least one intermediate device on the forward path and measure the network performance on the forward path based on the measurement indication information to obtain first measurement information; and send the first measurement information.

18. The network performance measurement system of claim 17, wherein the first AMP packet comprises an In-situ Operation, Administration and Maintenance (IOAM) header of IOAM, wherein the measurement indication information is comprised in the IOAM header.

19. The network performance measurement system of claim 17, wherein the first AMP packet comprises a segment list, wherein the segment list indicates the forward path, and wherein the measurement indication information is comprised in a segment identifier that corresponds to a measurement device in the segment list.

20. The network performance measurement system of claim 17, wherein the measurement indication information instructs the first measurement device to measure network performance on the forward path.

* * * * *